US012527492B2

(12) United States Patent
DeMauro et al.

(10) Patent No.: US 12,527,492 B2
(45) Date of Patent: Jan. 20, 2026

(54) RAPID BREATHALYZER DIAGNOSTIC DEVICE FOR THE PRESENCE OF SARS-CoV-2

(71) Applicant: Rutgers, The State University of New Jersey, New Brunswick, NJ (US)

(72) Inventors: Edward P. DeMauro, Hamilton, NJ (US); German Drazer, Skillman, NJ (US); Hao Lin, Montgomery, NJ (US); Mehdi Javanmard, West Windsor, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 993 days.

(21) Appl. No.: 17/653,621

(22) Filed: Mar. 4, 2022

(65) Prior Publication Data

US 2022/0280062 A1  Sep. 8, 2022

Related U.S. Application Data

(60) Provisional application No. 63/157,484, filed on Mar. 5, 2021.

(51) Int. Cl.
 *A61B 5/08* (2006.01)
 *A61B 5/00* (2006.01)
 *A61B 5/097* (2006.01)

(52) U.S. Cl.
 CPC .............. *A61B 5/082* (2013.01); *A61B 5/097* (2013.01); *A61B 5/742* (2013.01)

(58) Field of Classification Search
 CPC ......... A61B 5/082; A61B 5/097; A61B 5/742; G01N 27/026; G01N 33/497;
 (Continued)

(56) References Cited

U.S. PATENT DOCUMENTS

2015/0369806 A1* 12/2015 Wang ............... G01N 33/56983
                                                                435/5
2020/0124625 A1*  4/2020 Dunlop ................ G01N 33/948
(Continued)

FOREIGN PATENT DOCUMENTS

WO        2019190596 A9    10/2019

OTHER PUBLICATIONS

Coronavirus Testing Basics, 2020, accessed Oct. 2020 (https://www.fda.gov/consumers/consumer-updates/coronavirus-testing-basics).

(Continued)

*Primary Examiner* — Eric J Messersmith
(74) *Attorney, Agent, or Firm* — Hamilton, Brook, Smith & Reynolds, P.C.

(57) ABSTRACT

A system and associated method for capturing and detecting a target analyte in a sample comprising an aerosol include a capture device, to capture a sample comprising an aerosol including a target analyte. The capture device includes an input to receive the sample, an output to release the sample for capturing, and a channel to flow the sample from the input toward the output. The channel is configured to accelerate the flowing sample to allow capturing of particles from the flowing sample, to thereby generate a captured sample including the target analyte. A sensor device is coupled to the capture device to receive at least a portion of the captured sample including the target analyte, to detect the target analyte in the captured sample based on an impedance measurement. The capture device can include a nozzle and an impact plate coupled with the nozzle and the sensor device.

20 Claims, 26 Drawing Sheets
(1 of 26 Drawing Sheet(s) Filed in Color)

(58) Field of Classification Search
CPC .............. G01N 1/2208; G01N 27/3276; G01N 33/5438; C09D 11/04; C09D 11/52; C09D 11/30; H01B 5/14; B41M 5/0082
See application file for complete search history.

(56) References Cited

U.S. PATENT DOCUMENTS

| | | | |
|---|---|---|---|
| 2020/0215364 A1* | 7/2020 | Webb | A61M 16/06 |
| 2020/0245899 A1* | 8/2020 | Heanue | A61B 5/082 |
| 2021/0325380 A1* | 10/2021 | Muthukumar | G01N 33/5438 |
| 2023/0380720 A1* | 11/2023 | Peumans | A61B 5/082 |

OTHER PUBLICATIONS

Overview of Testing for SARS-CoV-2 (COVID-19), 2020, accessed Oct. 2020 (https://www.cdc.gov/coronavirus/2019-ncov/hcp/testing-overview.html).

Hilpert, M., Ilievskia, V., Shao-Yiu, H., Rule, A. M., Olmedo, P., Drazer, G., "E-cigarette Aerosol Collection Using Converging and Straight Tubing Sections: Physical Mechanisms", J. Colloid Interface Sci., 2020, in press.

Johnson, G.R., Morawska, L., Ristovski, Z.D., Hargreaves, M., Mengersen, K., Chao, C.Y.H., Wan, M.P., Li, Y., Katoshevski, D., and Corbett, S., "Modality of human expired aerosol size distributions," J. Aerosol Sci., 2011, vol. 42, No. 12, pp. 839-851.

Lindsley, W.G., Pearce, T.A., Hudnall, J.B., Davis, K.A., Davis, S.M., Fisher, M.A., Khakoo, R., Palmer, J.E., Clark, K.E., Celik, I., Coffey, C.C., Blachere, F.M., and Beezhold, D.H., "Quantity and size distribution of cough-generated aerosol particles produced by influenza patients during and after illness," J. Occup. Environ. Hyg., 2012, vol. 9, No. 7, pp. 443-449.

Lu, R., Zhao, X., Li, J., Niu, P., Yang, B., Wu, H., Wang, W., Song, H., Huang, B., Zhu, N., Bi, Y., Ma, X., Zhan, F., Wang, L., Hu, T., Zhou, H., Hu, Z., Zhou, W., Zhao, L., Chen, J., et al., "Genomic characterization and epidemiology of 2019 novel coronavirus: implications for virus origins and receptor binding," Lancet, 2020, vol. 395, pp. 565-574.

Mahmoodi, S.R., Xie, P., Allen, M., and Javanmard, M., "Multiwell plate impedance analysis of a nanowell array sensor for label-free detection of cytokines in mouse serum," Chemical and Biological Sensors, 2020, vol. 4, No. 2, 4500104.

Seo, G., Lee, G., Kim, M.J., Baek, S.H., Choi, M., Ku, K.B., Lee, C.S., Jun, S., Park, D., Kim, H.G., Kim, S.J., Lee, J.O., Kim, B.T., Park, E.C., and Kim, S.I., "Rapid detection of COVID-19 causative virus (SARS-CoV-2) in human hasopharyngeal swab specimens using field-effect transistor-based biosensor," ACS Nano, 2020, vol. 14, No. 4, pp. 5135-5142.

Verreault, D., Moineau, S., and Duchaine, C., "Methods for sampling of airborne viruses," Microbiol. Mol. Biol. R., 2008, vol. 72, No. 3, pp. 413-444.

Wölfel, Roman, Victor M. Corman, Wolfgang Guggemos, Michael Seilmaier, Sabine Zange, Marcel A. Müller, Daniela Niemeyer, et al. "Virological Assessment of Hospitalized Patients with COVID-2019." Nature 581, No. 7809 (May 2020): 465-69. https://doi.org/10.1038/s41586-020-2196-x.

* cited by examiner

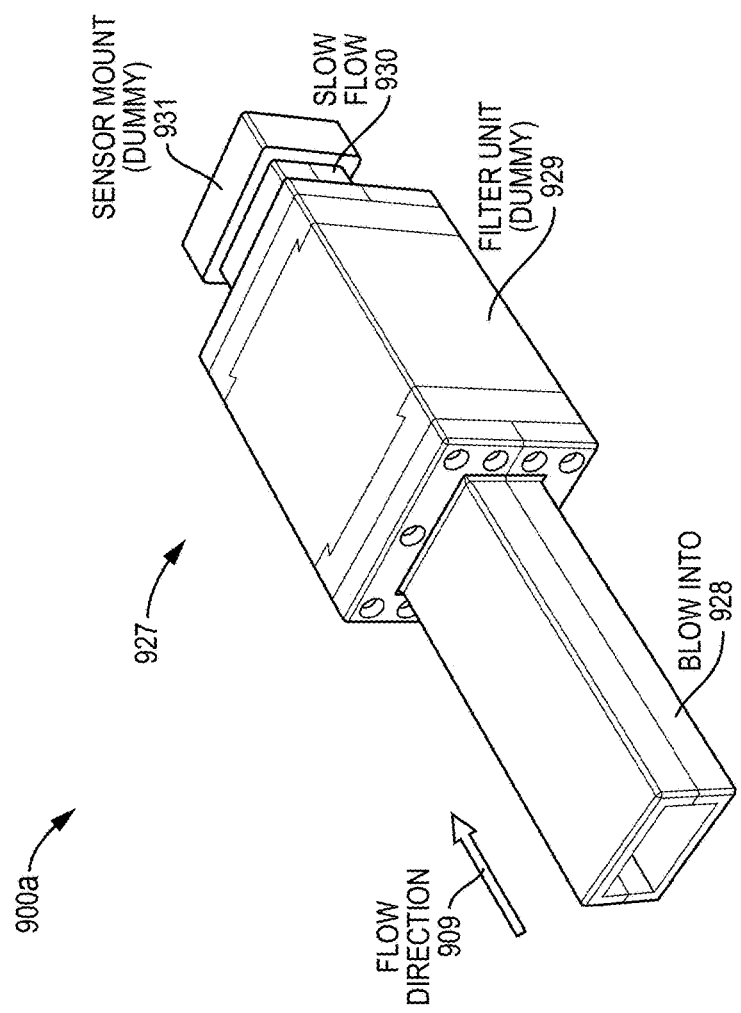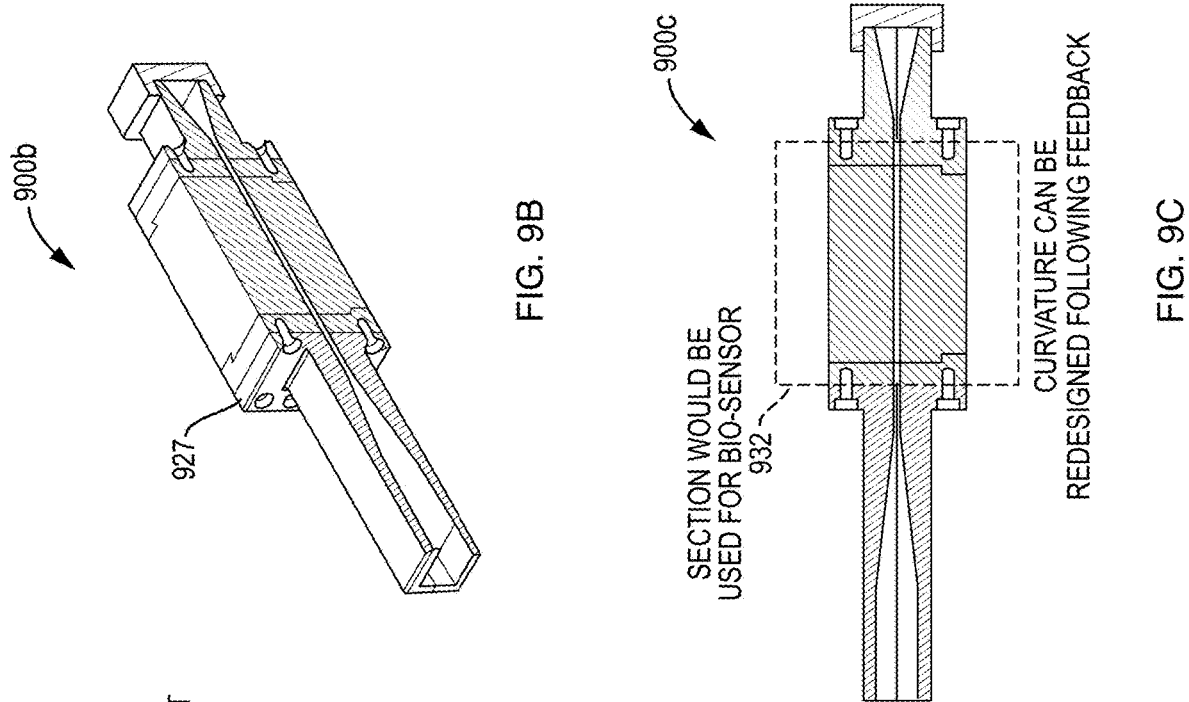

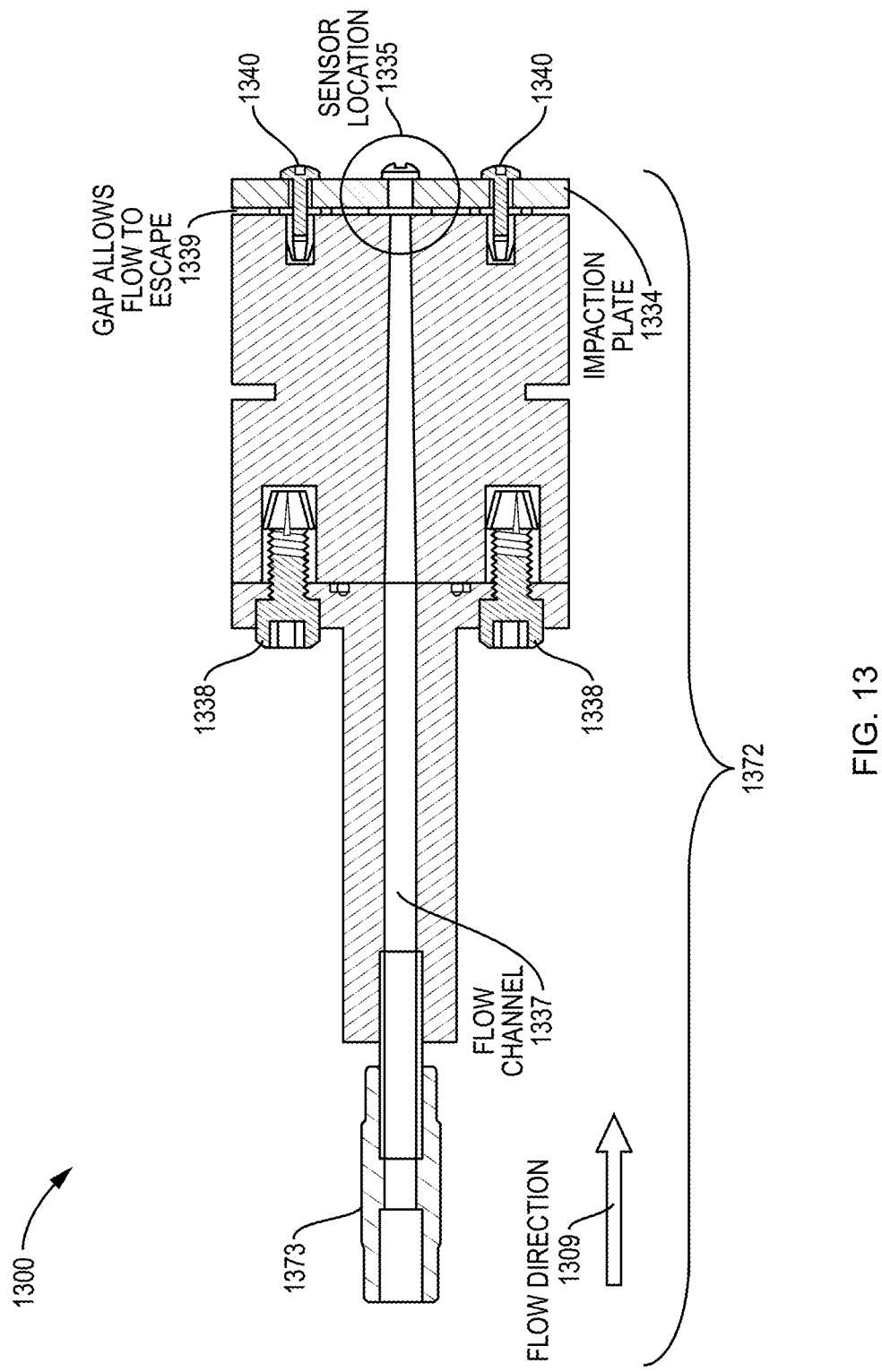

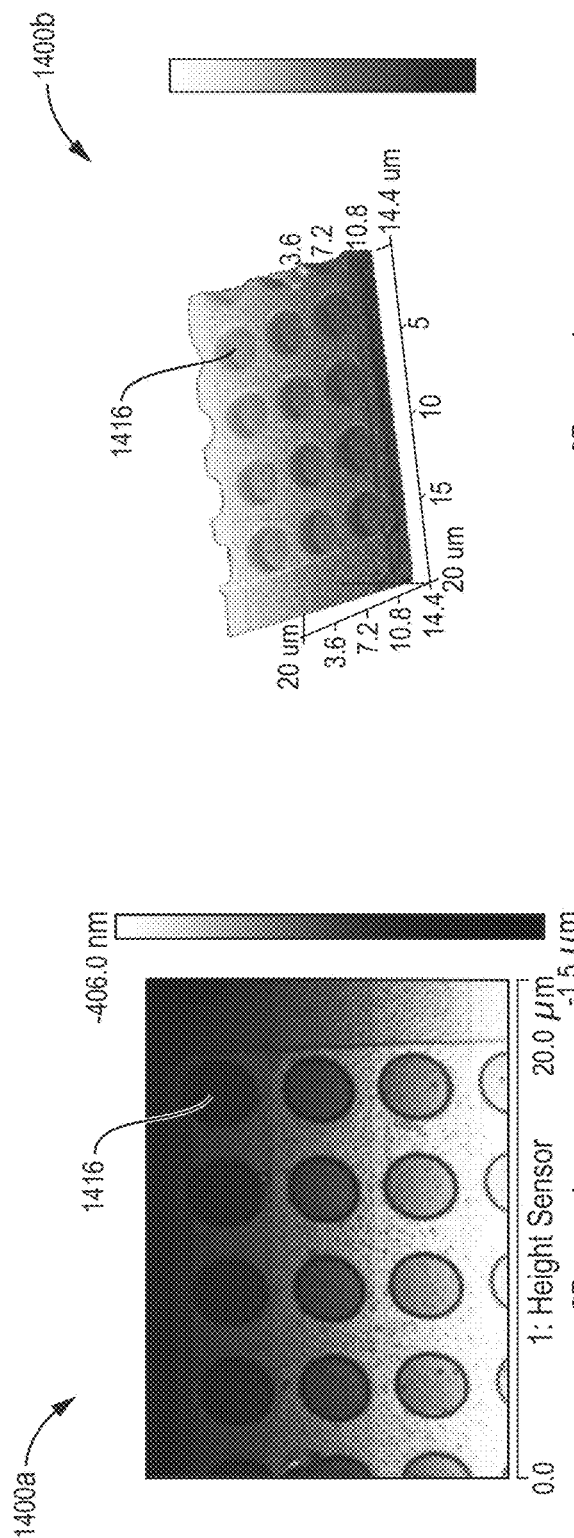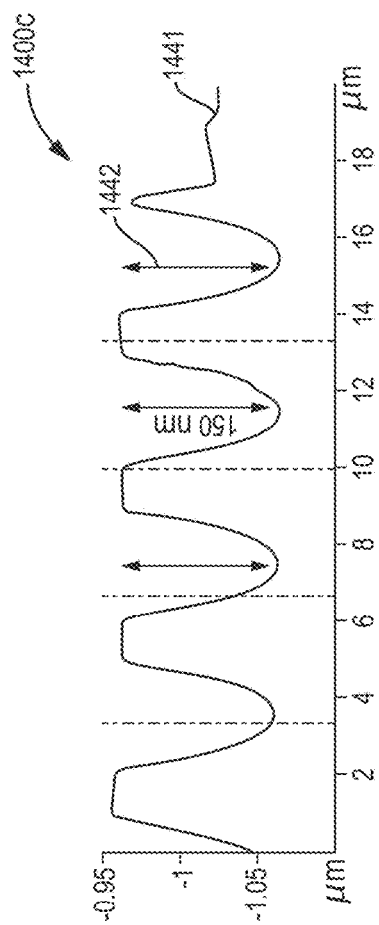
FIG. 14A  1: Height Sensor 2D scanning
FIG. 14B  3D scanning
FIG. 14C

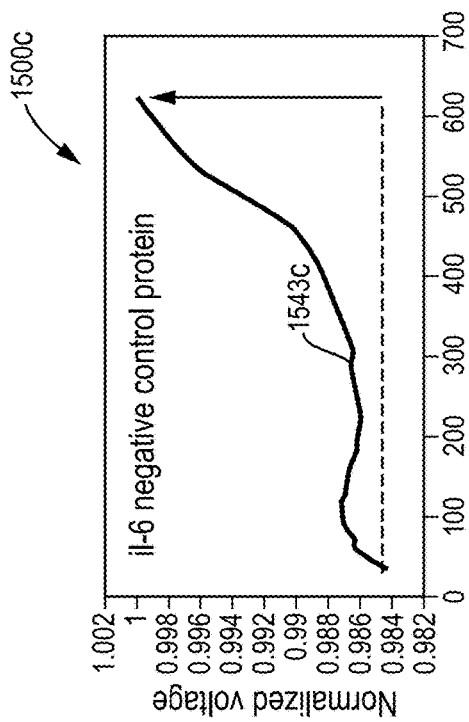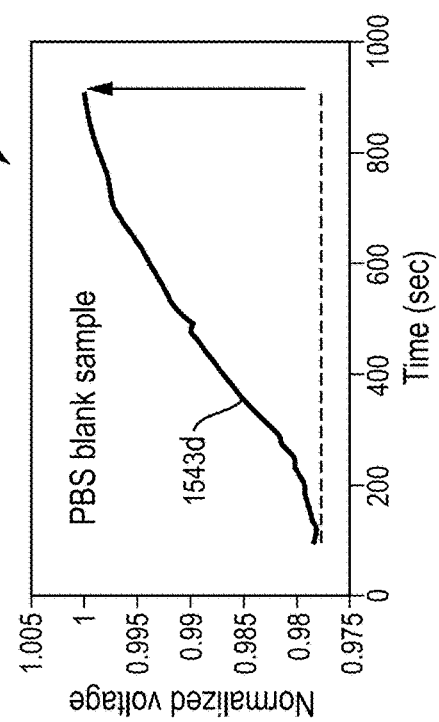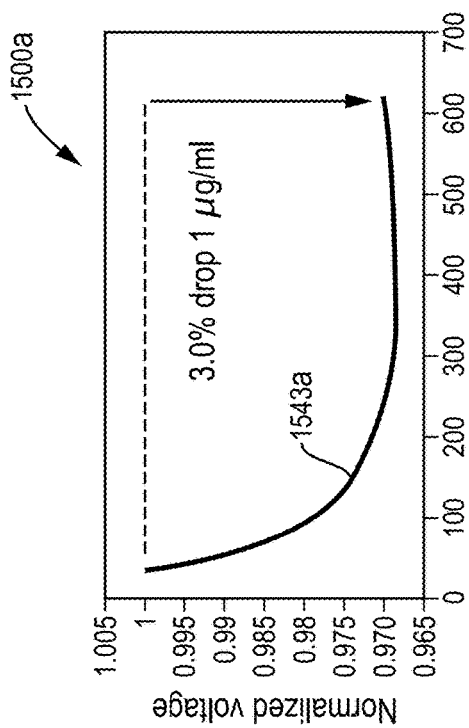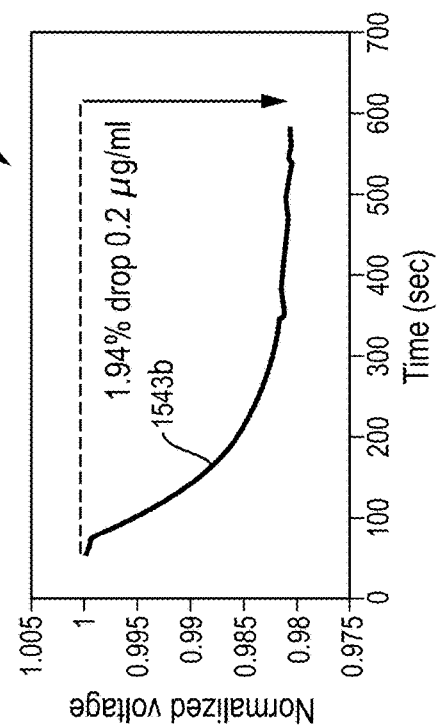
FIG. 15A
FIG. 15B
FIG. 15C
FIG. 15D

INLET SYSTEM → AEROSOL GENERATOR → LIQUID IMPACTOR 1746, 1747, 1748, 1700

FIG. 17

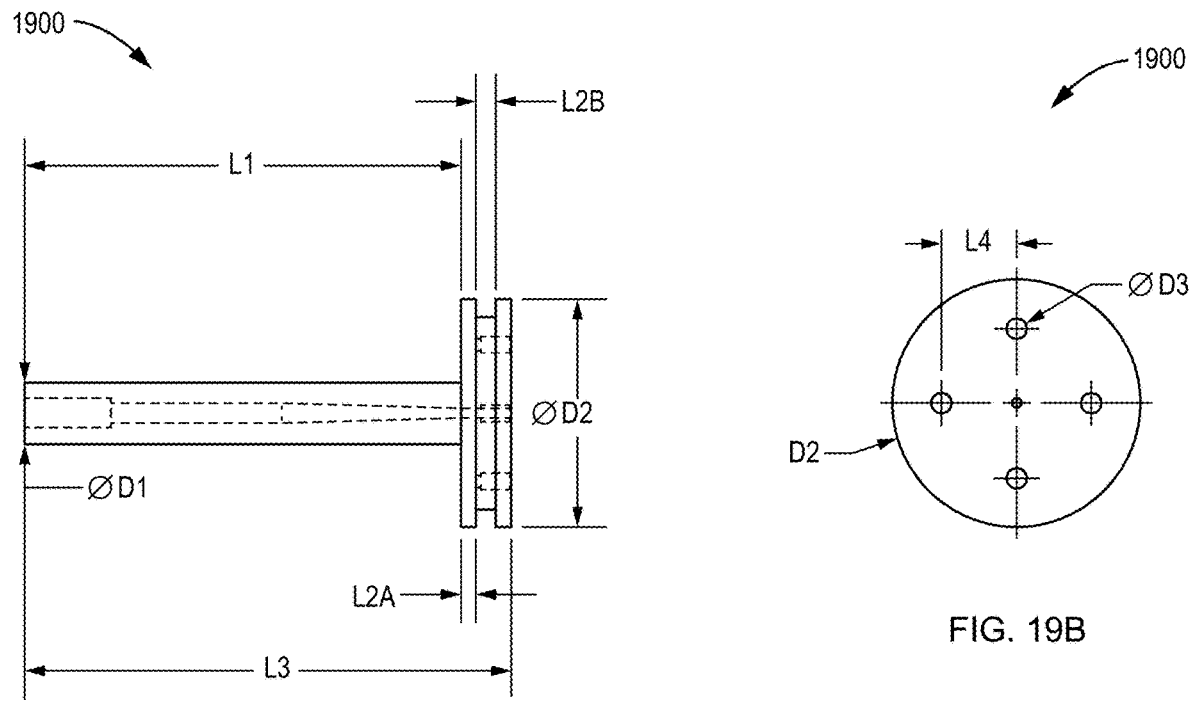
FIG. 19A
FIG. 19B
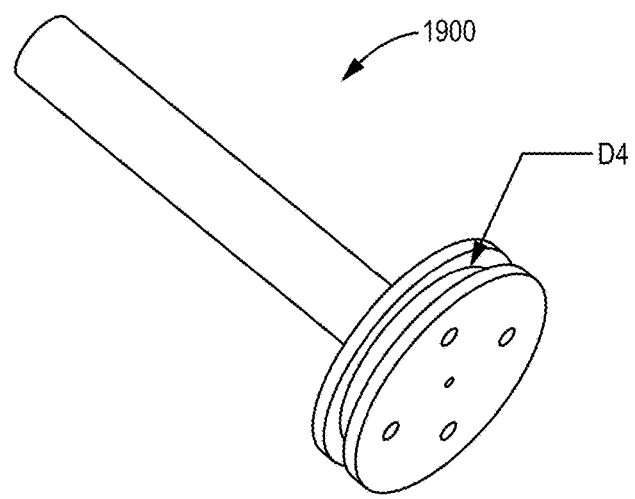
FIG. 19C

```
                                    ┌─ 2300
                                 ___│___
                              ╱          ╲
                           ╱   CAPTURE A SAMPLE COMPRISING AN AEROSOL INCLUDING   ╲
                         ╱      A TARGET ANALYTE AT A CAPTURE DEVICE, TO THEREBY   ╲
                        │              GENERATE A CAPTURED SAMPLE                   │
```

- CAPTURE A SAMPLE COMPRISING AN AEROSOL INCLUDING A TARGET ANALYTE AT A CAPTURE DEVICE, TO THEREBY GENERATE A CAPTURED SAMPLE
  - RECEIVE THE SAMPLE AT AN INPUT OF THE CAPTURE DEVICE — 2391a
  - FLOW THE SAMPLE THROUGH A A CHANNEL FROM THE INPUT TOWARD AN OUTPUT OF A CAPTURE DEVICE, THE CHANNEL CONFIGURED TO ALLOW CAPTURING OF PARTICLES FROM THE FLOWING SAMPLE — 2391b
  - RELEASE THE SAMPLE FOR CAPTURING FROM THE OUTPUT OF THE CAPTURE DEVICE — 2391c
  - 2391

- RECEIVE AT LEAST A PORTION OF THE CAPTURED SAMPLE AT A SENSOR DEVICE COUPLED TO THE CAPTURE DEVICE — 2392

- DETECT, BASED ON AN IMPEDANCE MEASUREMENT, THE TARGET ANALYTE IN THE CAPTURED SAMPLE — 2393

FIG. 23

ND DIAGNOSTIC
RAPID BREATHALYZER DIAGNOSTIC DEVICE FOR THE PRESENCE OF SARS-CoV-2

RELATED APPLICATION

This application claims the benefit of U.S. Provisional Application No. 63/157,484, filed on Mar. 5, 2021. The entire teachings of the above application are incorporated herein by reference.

GOVERNMENT SUPPORT

This invention was made with government support under Grant No.: 3U01HL150852-02S1 from the National Institutes of Health. The government has certain rights in the invention.

BACKGROUND

Although schools have taken many necessary precautions against infection and spread of Coronavirus Disease 2019 (COVID-19), completely avoiding all risk of spread is impractical at best. Many students have been subjected to nasal swabs, which young children find intimidating and scary. As the march towards normalcy continues, rapid, non-intrusive testing is necessary to trace infections, contain new outbreaks, and keep children in school.

SUMMARY

Methods and systems are disclosed that relate to an antibody-based breathalyzer technology to capture and detect a target analyte in a sample comprising an aerosol. The technology can be used to detect viral protein, such as severe acute respiratory syndrome coronavirus 2 (SARS-CoV-2) spike protein, in exhaled breath rapidly, e.g., within 10 minutes.

A system for capturing and detecting a target analyte in a sample comprising an aerosol includes a capture device, to capture a sample comprising an aerosol including a target analyte, and a sensor device. The capture device includes (i) an input to receive the sample, (ii) an output to release the sample for capturing, and (iii) a channel to flow the sample from the input toward the output. The channel is configured to accelerate the flowing sample to allow capturing of particles from the flowing sample, to thereby generate a captured sample including the target analyte. The sensor device, which is coupled to the capture device to receive at least a portion of the captured sample including the target analyte, is configured to detect the target analyte in the captured sample based on an impedance measurement.

The capture device can include a nozzle, wherein (i) a proximal end of the nozzle includes the input of the capture device, (ii) a distal end of the nozzle includes the output of the capture device, and (iii) the distal end of the nozzle further includes a flange configured to facilitate coupling of the sensor device to the capture device.

The capture device can further include an impact plate mechanically coupled with (i) the flange of the distal end of the nozzle and (ii) the sensor device, the impact plate configured to capture the particles in the flowing sample, the impact plate thus forming, with the nozzle, a liquid impactor as the capture device.

The impact plate can be configured to receive the particles in the flowing sample at an angle within 5 percent of 90 degrees with respect to a parallel plane of the impact plate.

The nozzle can provide for an internal travel distance between the input and output of the capture device within 5 percent of 108 mm.

The impact plate can be mounted apart from the output of the capture device, at a distance less than or equal to 2 mm from the output of the capture device.

The channel can be configured to accelerate the flowing sample to a velocity within 10 percent of one hundred meters per second.

The system can include circuitry operatively coupled with the sensor device and configured to (i) apply an electrical voltage to the captured sample and (ii) perform the impedance measurement to detect the target analyte in the captured sample.

The sensor device can include a sensor array including a pair of conducting electrodes, the electrodes separated by a gap, an insulator disposed in the gap between the electrodes, and plural wells defined by one of the electrodes and the insulator, to expose the other of the electrodes. The wells can be configured to receive a captured sample including the target analyte, the target analyte, when present in the captured sample received in the wells, modulating an impedance between the electrodes, the impedance measurement performed to quantify the modulated impedance, the modulated impedance being indicative of the concentration of the target analyte in the captured sample.

The system can include a processor operatively coupled with the sensor device, the processor configured to calculate a concentration of the target analyte in the captured sample as a function of the modulated impedance.

The system can include an output display unit responsive to the detected target analyte and configured to generate an indication that a subject is testing positive or negative for the target analyte based on the concentration of the target analyte detected in the captured sample.

A method of capturing and detecting a target analyte in a sample comprising an aerosol includes capturing a sample comprising an aerosol including a target analyte at a capture device. The sample is captured by (i) receiving the sample at an input of the capture device, (ii) flowing the sample through a channel from the input toward an output of the capture device, the channel configured to accelerate the flowing sample to allow capturing of particles from the flowing sample, and (iii) releasing the sample for capturing from the output of the capture device, to thereby generate a captured sample including the target analyte. The method further includes receiving at least a portion of the captured sample at a sensor device coupled to the capture device; and detecting, based on an impedance measurement, the target analyte in the captured sample.

The method can include accelerating the sample flowing in the channel to a velocity within 10 percent of one hundred meters per second.

In the method, the sensor device can include a sensor array including a pair of conducting electrodes, the electrodes separated by a gap, an insulator disposed in the gap between the electrodes, and plural wells defined by one of the electrodes and the insulator, to expose the other of the electrodes. The method can further include receiving a captured sample including the target analyte at a given well of the plural wells, the target analyte, when present in the captured sample received in the wells, modulating an impedance between the electrodes, applying an electrical voltage to the impedance between the electrodes; performing the impedance measurement with the applied electrical voltage to quantify the modulated impedance, and calculating the concentration of the target analyte in the captured sample as a function of the modulated impedance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 9A-C are illustrations of an example nozzle component of a capture device.

FIG. 13 is a schematic diagram of an example embodiment of a capture device.

FIGS. 14A and 14B show images of an example nanowell sensor array

FIG. 14C shows a topological representation of example nanowell sensors.

FIGS. 15A-D are plots showing results of a sensitivity test.

FIG. 17 is a block diagram illustrating an example 1700 of an experimental setup of the integrated system.

FIGS. 19A-E are CAD drawings showing various views of an example embodiment of a nozzle component of a capture device.

FIG. 23 is a block diagram illustrating an example embodiment of a method of capturing and detecting a target analyte.

DETAILED DESCRIPTION

Figure 1:
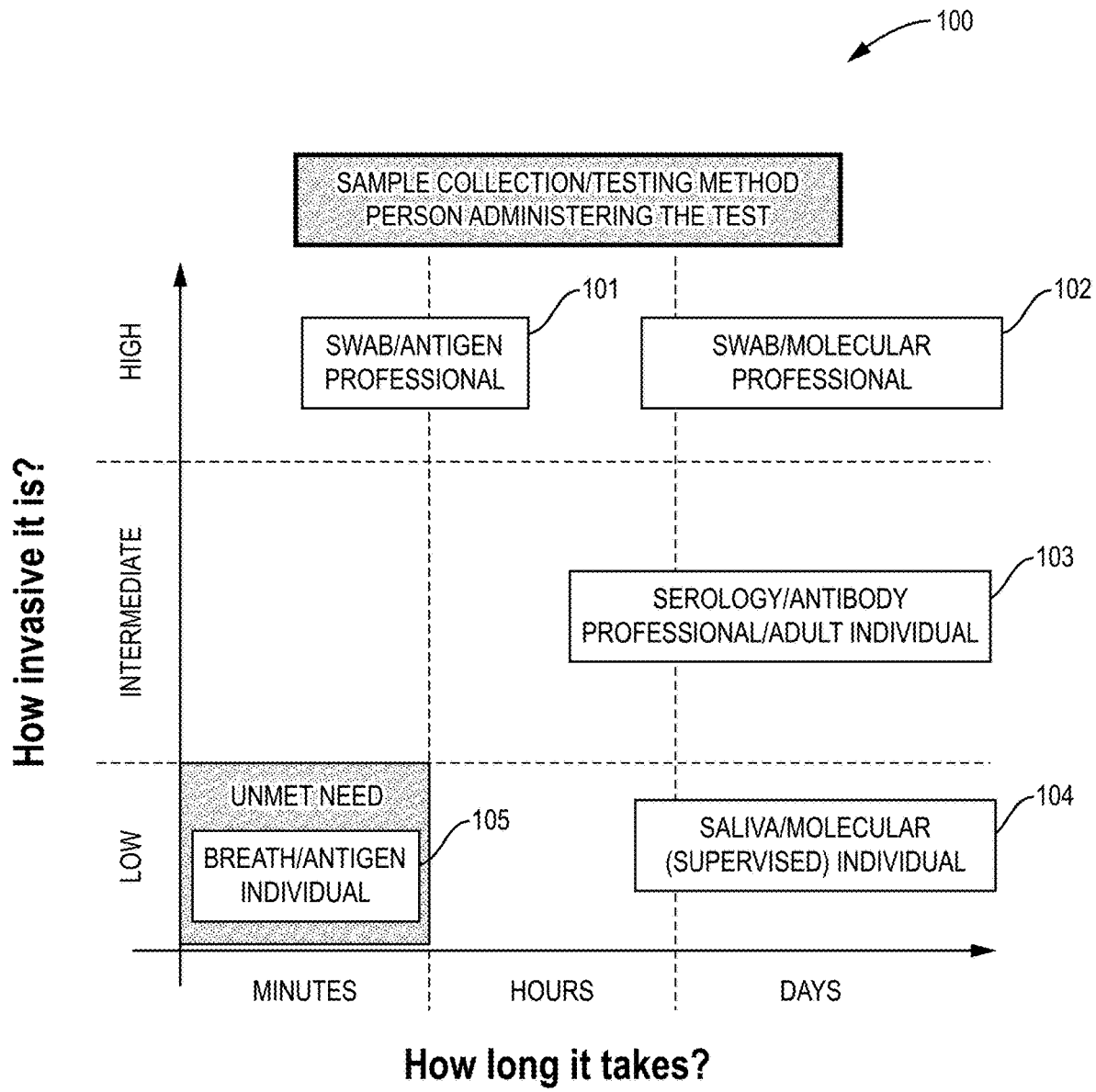
FIG. 1 is a graph summarizing the state of the art of viral testing.

A description of example embodiments follows.

The emergence of the SARS-CoV-2 virus in late 2019, and the resulting COVID-19 pandemic that began in 2020, has transformed the world in many ways. The SARS-CoV-2 virus will likely persist as a serious concern once the major threat of the pandemic finally begins to wane. Testing for SARS-CoV-2 will thus remain important, going forward, as a means of controlling and mitigating the spread of the virus. There are different approaches to testing for of SARS-CoV-2, including viral testing and antibody testing (Overview of Testing for SARS-CoV-2 (COVID-19), 2020). Currently, the United States Food and Drug Administration (FDA) has not authorized antibody testing, and the United States Centers for Disease Control and Prevention (CDC) do not recommend it as the sole basis for diagnosis. On the other hand, various available viral testing options, including nasal swabs and saliva tests, have limitations that negatively impact their usefulness. For instance, the nasal swab test is intrusive for patients, and requires processing at a lab. Saliva tests also generally require lab processing. Qualified personnel may be needed for administering and processing of tests, and a lead time of at least several hours may be expected in order to obtain the results of such tests.

A major bottleneck within the testing domain results from the fact that sample collection and sample processing are performed separately. The need for substantial numbers of tests has been made clear in recent months. Testing solutions that are non-invasive, rapid, and robust, while requiring minimal guidance, are particularly advantageous. The current dollar market for COVID-19 diagnostic testing is substantial and estimated to be over $10 billion. The COVID-19 disease burden is likewise high, with over 75 million individuals diagnosed, and over 950,000 deaths reported, in the United States alone. For efficient and accurate COVID-19 diagnosis, clinicians need a portable or an on-site diagnostic test for real-time management of patients in minimal time.

Embodiments described herein address the aforementioned shortcoming by processing the samples as soon as they are collected. Such embodiments may provide results just 20 minutes or less, with some such embodiments providing results in 10 minutes or less. Embodiments address the need for rapid non-invasive SARS-CoV-2 testing that can be self-administered with minimal supervision or guidance. Embodiments may, according the present approach, combine one or more of the following concepts: a wet scrubber; a specially adapted nozzle apparatus; an impactor, e.g., a liquid impactor; and a sensor, e.g., a nanowell sensor, often referred to as a "lab-on-a-chip."

Embodiments include a testing platform that detects SARS-CoV-2 virions in a patient's breath, comprising a sort of viral breathalyzer. When a person exhales into such a viral breathalyzer, droplets and other emitted particles may be captured by a liquid-membrane scrubber (patent pending) inside the collection unit. Subsequently, the anchored droplets forming the liquid-membrane are retrieved into a microfluidic chip that contains the nanowell sensors (patent pending) capable of detecting the presence of SARS-CoV-2 virus. Alternatively, a nozzle apparatus may be used to appropriately accelerate particles traversing a channel disposed axially therein, so as to promote retention of such particles upon the microfluidic chip by impaction therewith.

The device may provide results within a time frame of 20 minutes using an impedance measurement approach.

Embodiments may be easily adapted to future needs and challenges, not only as the virus causing COVID-19 evolves in future years, but also to provide multiplexing capabilities to detect multiple viruses in tandem. Embodiments may provide for a disposable breathalyzer that is not invasive (in contrast with traditional sampling techniques), is easy to use with rapid point of care results, and has accurate reporting with high sensitivity and specificity.

Embodiments provide a Viral Antigen Test (VAT), which may assess the presence of viruses including, but not limited to, SARS-CoV-2 and Influenza A H1N1 subtype antigens within a sample. A spike protein may be selected as a target for SARS-CoV-2 detection due to its inherent features, including that it is located on the external surfaces of the SARS-CoV-2 virus, and that it is genetically unique to a particular coronavirus and can function as an identification marker (Lu et al. 2020; Seo et al. 2020). Being an external feature of the virus allows for detection without intermediate steps such as lysing. This contrasts with most tests that are Polymerase chain reaction (PCR) tests (i.e. molecular tests), which are the standard for detection. At their core, such PCR tests synthesize viral DNA from an RNA sample. Once the DNA has been synthesized within a lab, the presence of virus can be readily identified. The inherent time lag, therefore, is associated with transportation and lab processing. Furthermore, the test typically requires the use of a nasal swab, although more recently developed test solutions can work using saliva. Embodiments thus provide a crucial service to society by combining the rapidness of an antigen test with the ability to capture a high concentration of virions directly from a patient's exhaled breath.

Molecular diagnosis using real-time RT-PCR may take at least 3 hours, including preparation of viral RNA. In addition, the RNA preparation step can affect diagnostic accuracy. Hence, highly sensitive immunological diagnostic methods that directly detect viral antigens in clinical samples without sample preparation steps are essential. The viral breathalyzer technology proposed herein is unique and stands alone compared to other sampling techniques such as nasopharyngeal and saline collections. The viral breathalyzer is also more rapid than PCR testing, and technologically avoids "manual" sample preparation, thus limiting inaccuracies.

As an example, the home and elderly health care segment has been particularly hard hit by the pandemic, thus making this market segment particularly important. Embodiments may be of particular value in nursing homes because they are locally administered and user-friendly, requiring little effort to breathe into the apparatus by elderly patients, and requiring limited skill sets by nursing staff in obtaining and reporting a result. Importantly, the rapid testing ability of embodiments is supportive of implementing a rapid isolation of infected staff and residents.

As another example, as young children return to school and daycare in a world with COVID-19, the need for increased, widespread, and rapid testing is crucial for containing outbreaks and performing contact tracing. Two major obstacles prevent the realization of this goal: the aforementioned bottleneck associated with lab processing and sample maturation; and the invasiveness/complexity of current tests, which may be intimidating to a young child, disabled adult, or their caretakers. Implementations of contact tracing stipulate that these obstacles be overcome immediately, especially when considering children, kindergarten-age or younger, and special needs individuals, where difficulties with social distancing and mask compliance can easily lead to increased spread of infection before symptoms are even noticed. Embodiments include a new, non-invasive diagnostic for detecting the presence of SARS-CoV-2 in exhaled breath, combining an impactor with a nanowell array sensor to provide results within minutes as opposed to days. Embodiments thus enable widespread testing for SARS-CoV-2 within schools, daycares, group homes, and mass gatherings, enhancing contact-tracing efforts while protecting healthcare workers from unnecessary exposure.

Embodiments include an easy-to-use, non-invasive breathalyzer for quick and accurate diagnosis of respiratory diseases using a viral antigen assay. Embodiments thus combine the efficiency of an impactor with an antigen impedance sensor, providing a less intimidating experience compared with the current nasal swab approach. Conceptually, embodiments allow a user to blow into a disposable system with a sensor that is capable of returning rapid results within, e.g., 20 minutes. For this reason, embodiments are simple, relatively non-invasive, and conducive towards widespread implementation due to short processing time. Embodiments may enable widespread testing for SARS-CoV-2 within schools, daycares, group homes, and mass gatherings, enhancing contact-tracing efforts while protecting healthcare workers from unnecessary exposure.

While embodiments of the present disclosure include a rapid diagnostic for detecting the presence of SARS-CoV-2 within a person's exhaled breath, the core device is relatively agnostic to a specific application. In that sense, only the sensor is specific to SARS-CoV-2; this Can be modified, however, to detect the presence of other viruses using appropriate probe antibodies. Embodiments may thus be capable of multiplexing, i.e., providing for simultaneous detection of at least two viruses at once. This multiplexing capability has been demonstrated by detecting both SARS-CoV-2 and H1N1.

Recently, the United States National Institutes of Health (NIH) issued a call for RFA-OD-20-020, Novel Biosensing for Screening, Diagnosis and Monitoring of COVID-19 From Skin and The Oral Cavity. To enhance testing capabilities, this call specifically looks for novel testing approaches, detecting biosignatures of COVID-19 within exhaled breath. Embodiments provide a solution to this problem, with provisions for expanding the application to potential future pandemics and other viral respiratory diseases.

A filtration unit of the disclosed breathalyzer embodiment may include a liquid membrane-base filtration and particle separation system as described in Publication WO 2018/218181A1 of International Application No. PCT/US2018/034712, entitled "Anchored-Liquid Stationary Phase For Separation And Filtration Systems," the teachings of which are incorporated by reference in their entirety.

A nanowell sensor for detecting analytes in the liquid using impedance measurements suitable for use with embodiments of the invention was previously described in Publication WO 2019/190596A9 of International Application No. PCT/US2018/056718, entitled "Transcutaneous Wearable Apparatus for Continuous Monitoring of Biomarkers in Blood," the teachings of which are incorporated by reference in their entirety.

The following are definitions of certain terms that can be used when describing aspects of the present disclosure.

Antigen: External feature of a virus. The immune system uses the presence of an antigen as a marker for identifying a virus and triggering antibody production.

Lab-On-A-Chip: A device that can perform data processing and reporting on its own, without further input from an intermediate professional.

Liquid Column: Also called a "liquid bridge," this is a column of liquid formed from either the force of surface tension between a pair of closely spaced surfaces or from adhesion to some supporting medium.

Liquid Impactor: A device for collecting samples of airborne viruses or bacteria that accelerates contaminated air at least to Mach 1 before having it impact a reservoir of stagnant water.

Proof-Of-Concept Prototype: A prototype that may be used to validate functional aspects of embodiments. Different proof-of-concept prototypes may be used to explore different functionalities and test various aspects to be translated into a working prototype.

S-Protein: Short for "spike protein," which is an antigen of a coronavirus that allows the virus to attach to a host cell. Spike proteins are unique for each coronavirus and can further act as a means of identification.

SARS-CoV-2: The name of the coronavirus that is responsible for the disease known as COVID-19. Genetically similar to previous coronaviruses, SARS-CoV and MERS-CoV.

Viral Antigen Test: Detects protein markers for a virus, e.g., a respiratory virus.

Wet Scrubber: A system for removing airborne chemicals from a mass of air using an artificially-created rain to capture contaminants.

Working Prototype: A fully functional prototype with all desired functionality.

FIG. 1 is a graph 100 summarizing the state of the art of viral testing. The graph 100 illustrates that professionally-administered antigen swab tests 101 are relatively quick, but also invasive. The graph 100 further illustrates that professionally administered molecular swab tests 102 are similarly invasive, but take longer to produce results. Less invasive are professionally- or self-administered antibody serology tests 103, and still less invasive are self-administered molecular saliva tests 104. However, tests such as tests 103 and 104 take a similar amount of time as tests 102 to produce results, often requiring multiple days for sample transportation and processing.

Figure 2:
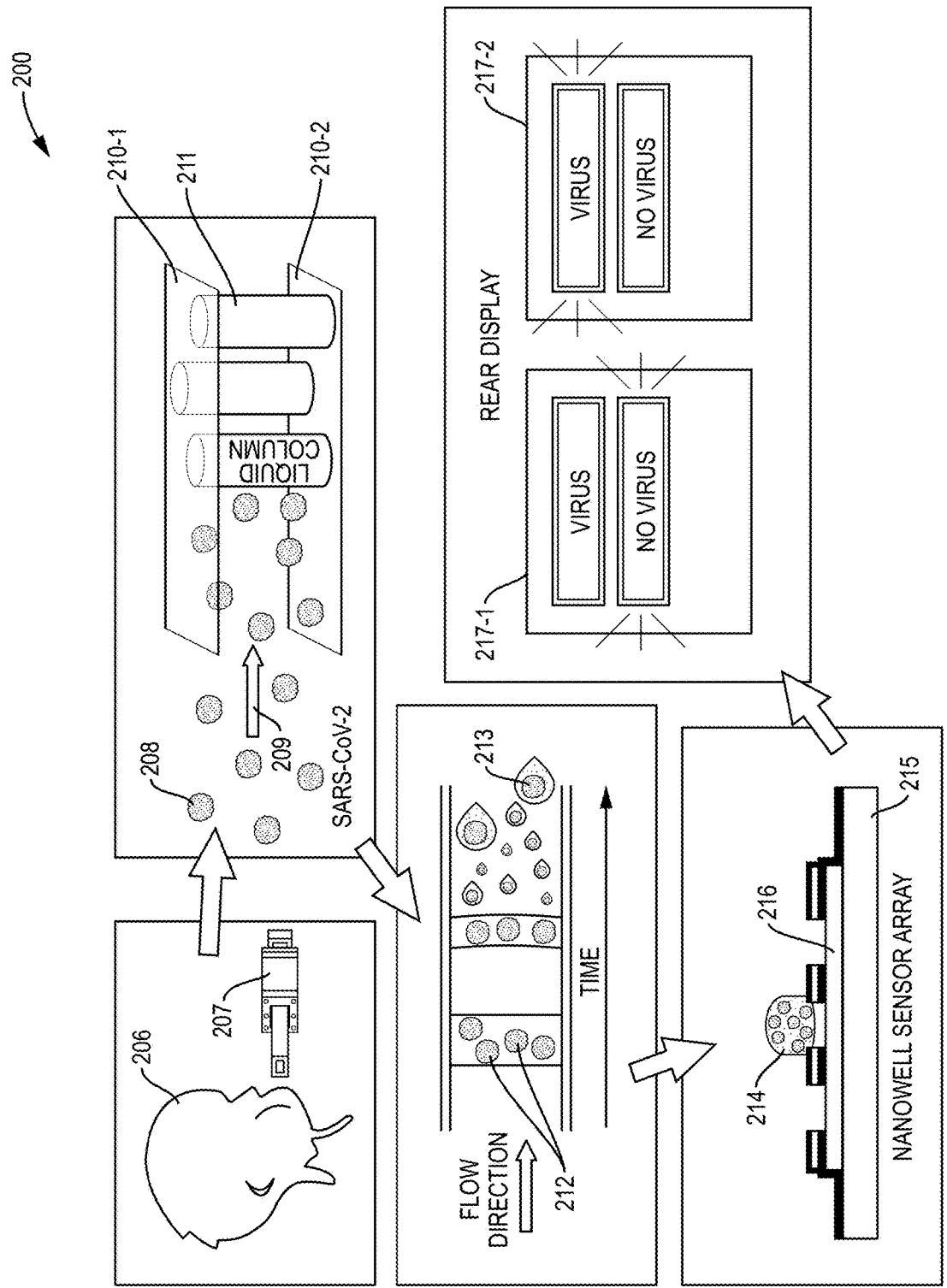
FIG. 2 is a block diagram illustrating an example assay performed according to the present disclosure.

FIG. 2 is a block diagram 200 illustrating an example assay performed according to the present disclosure: (i) A person 206 opens a disposable and sealed breathalyzer unit 207 and exhales into the unit 207, (ii) thus propelling particles 208 with a flow direction 209 between a top plate 210-1 and a bottom plate 210-2 of a liquid-membrane scrubber with liquid columns 211, producing trapped particles 212 such that aerosolized particles 213 are collected in the liquid-membrane scrubber and (iii) drops 214 containing such particles 213 are subsequently deposited onto nanowell sensors 216 of a nanowell sensor array 215. If a nanowell sensor 216 of the nanowell sensor array 215, in conjunction with any associated circuitry or processing components (not shown in FIG. 2), determines that no particles of a given virus are present within a deposited drop 214, a "No Virus" display 217-1 may be configured to illuminate. Otherwise, if it is so determined that such a virus is present in the drop 214, a "Virus" display 217-2 may be configured to illuminate. Other methods of indicating absence or presence of a given virus in a drop 214 may be alternatively used.

Figure 3:
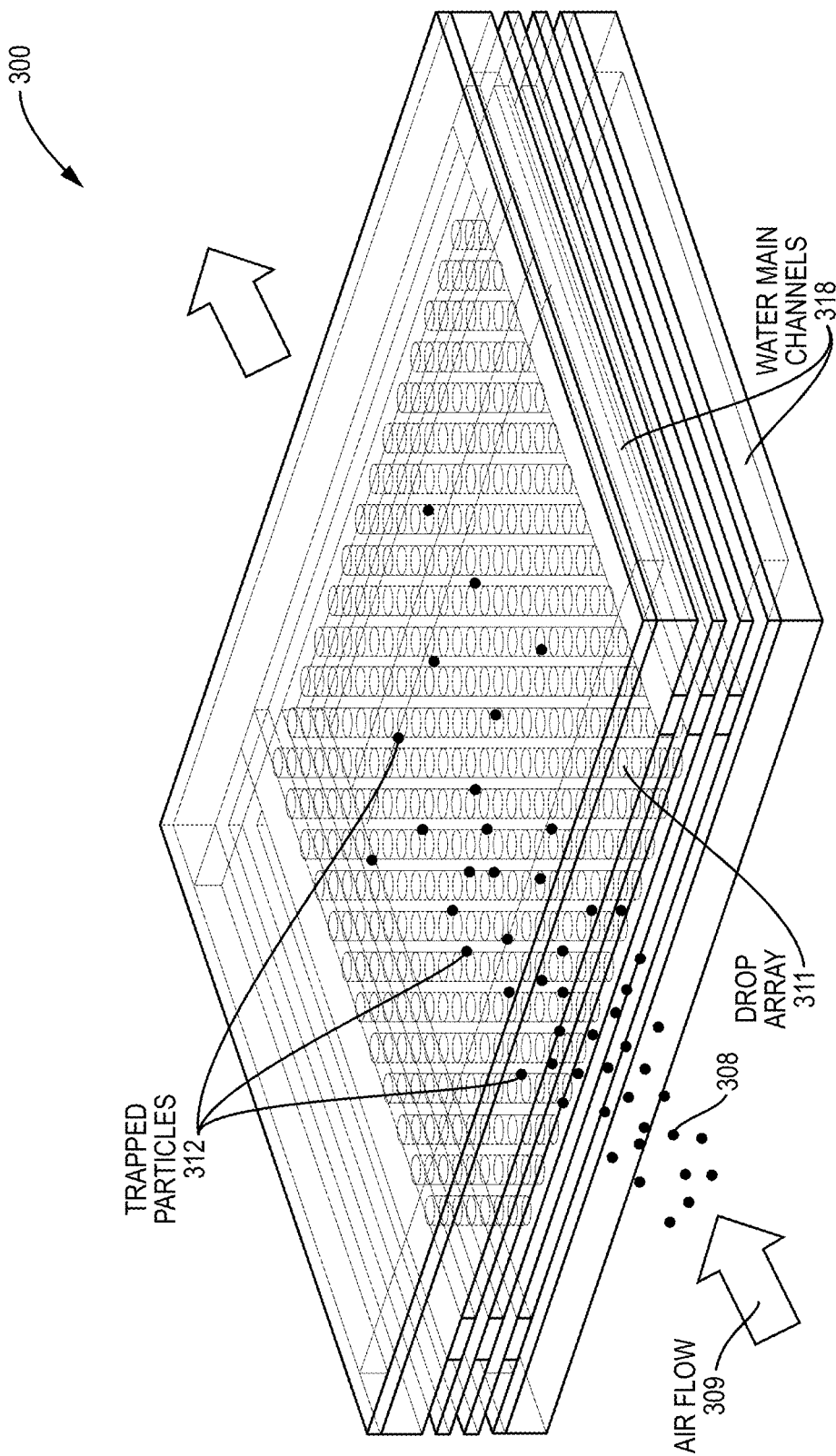
FIGS. 3 and 4 are respective illustrations of example stacked array liquid-membrane scrubbers.
Figure 4:
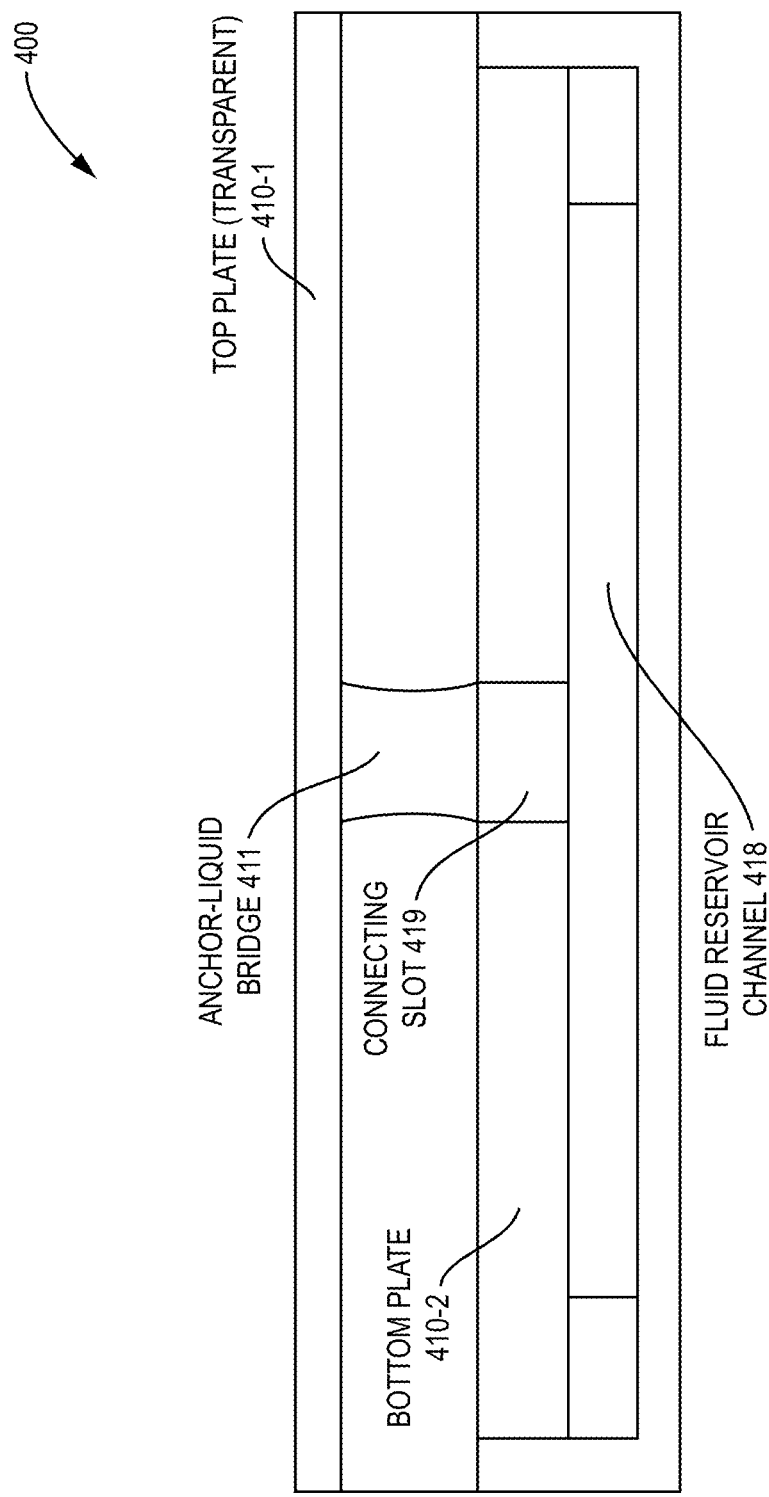

FIGS. 3 and 4 are respective illustrations of example stacked array liquid-membrane scrubbers 300 and 400. As is shown in FIGS. 3 and 4, the approach uses a stacked set of liquid columns; these are illustrated as "water channels" 318, 418. Also shown in FIG. 3 are incident particles 308 travelling 309 towards the scrubber, individual liquid columns, i.e., drop arrays 311, and trapped particles 312. Also shown in FIG. 4 are top plate 410-1, bottom plate 410-2, anchor-liquid bridge, i.e., liquid column 411, and connecting slot 419 to channel liquid between the water channels 418 and liquid column 411.

Figure 5:
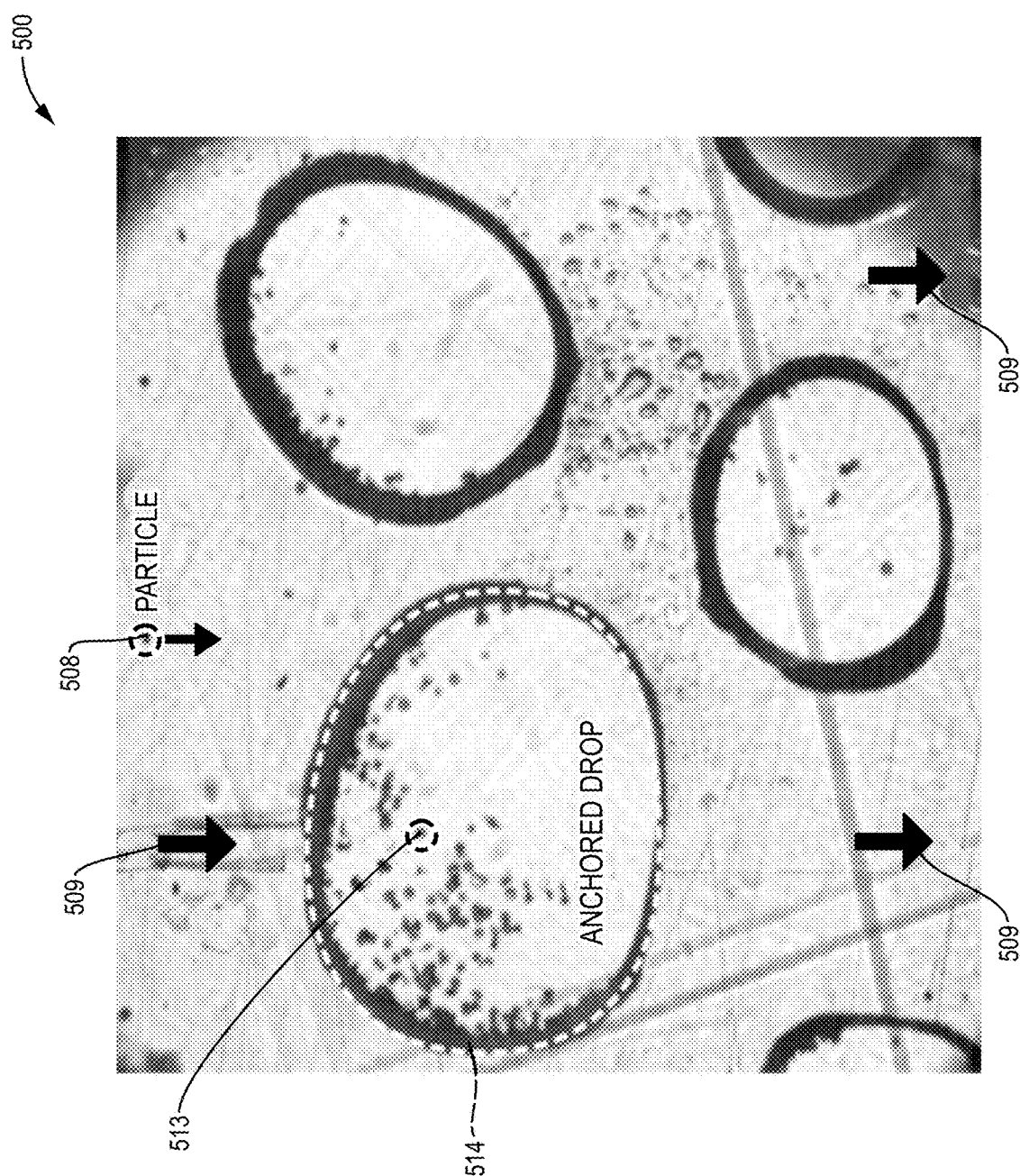
FIG. 5 is a photograph of anchored liquid drops trapping incident particles according to an experiment.

FIG. 5 is a photograph 500, obtained by microscope, of anchored liquid drops 514 trapping 513 incident glass particles 508 travelling in a direction 509 towards the drops 514, according to an experiment. The experiment demonstrated that at a moderate airflow speed of 3 m/s, 25-micron glass particles 508 are captured by liquid columns with high efficiency.

Figure 6:
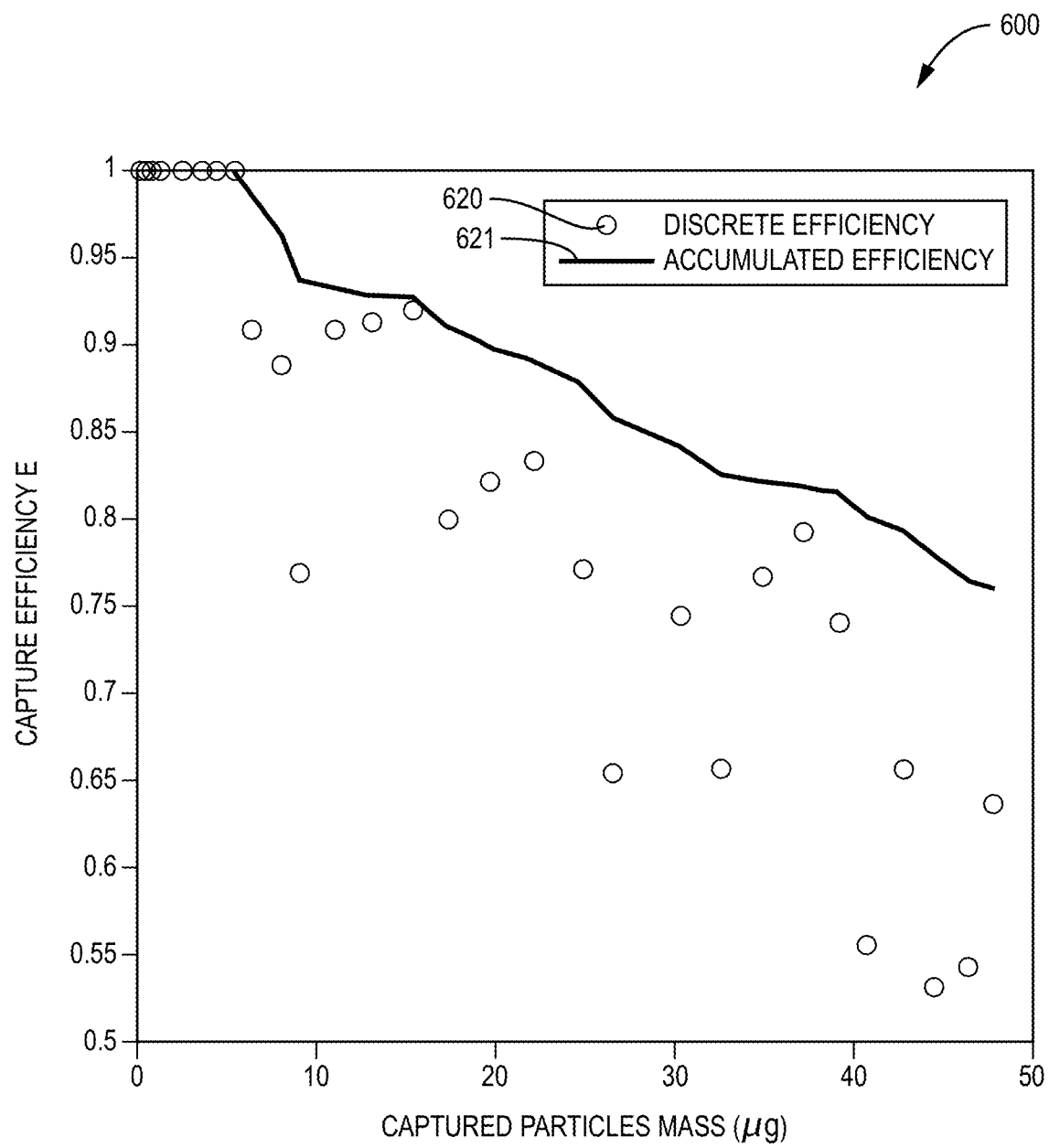
FIG. 6 is a plot depicting results of the experiment illustrated in FIG. 5

FIG. 6 is a plot 600 depicting results of the experiment illustrated by the photograph 500 of FIG. 5. Discrete efficiency 620 is initially 100% with freshwater columns, decreasing as more particles are collected. Such trend is illustrated as accumulated efficiency 621.

A liquid impactor is a device that has been proven to collect airborne pathogens (Verreault et al. 2008). The concept involves accelerating the airflow before it directly impacts, e.g., a pool of liquid. The deposition of the virus laden liquid columns on the nanowell sensor may be based on this technology. Some embodiments eschew the liquid column filtration system by implementing, as an impactor, a nozzle apparatus, to which an impact plate with mounted sensor is coupled. Embodiments use a nanowell impedance sensor, mounted within an impactor, for detecting biological material such as DNA and proteins based on antigen-antibody pairing (Mahmoodi et al. 2020).

Figure 7:
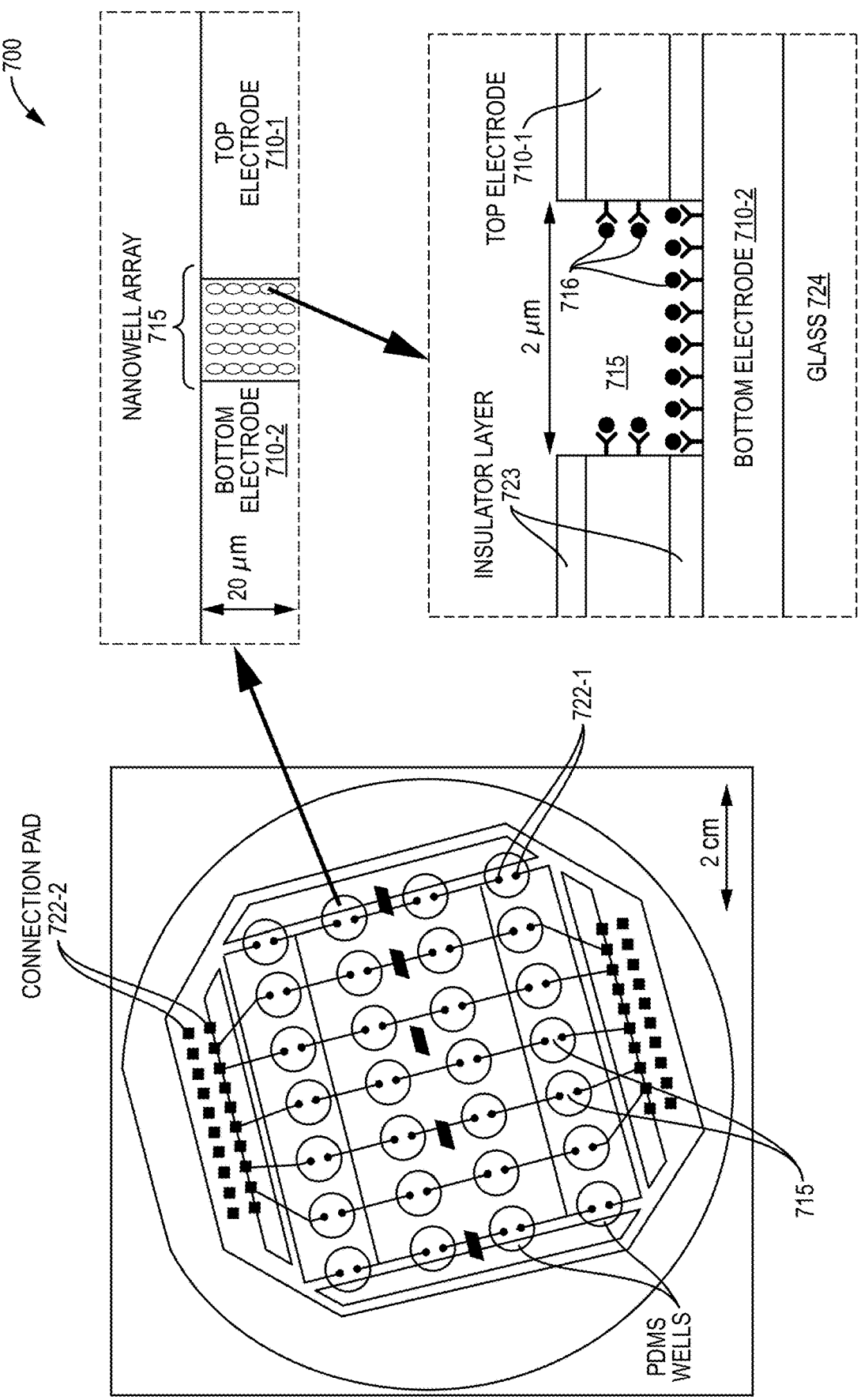
FIG. 7 depicts aspects of fabrication and operation of an example nanowell array.

FIG. 7 depicts aspects 700 of fabrication and operation of an example nanowell array 715. FIG. 7 includes a photograph of a wafer including an arrangement of nanowell arrays 715 with pairs of electrodes 722-1 disposed in each nanowell array 715. Electrodes 722-1 are connected, via conductive metal interconnect, to connection pads 722-2 that may be used to test operation of nanowell arrays on the wafer prior to dicing of the wafer. An inset, of an individual PDMS well on the wafer containing a respective nanowell array 715, shows top electrode 710-1, bottom electrode 710-2, and individual nanowells 716 of a nanowell array 715. Also depicted are insulating layers 723 and glass layer 724. Such a sensor 715 monitors impedance across a pair of electrodes 722-1 in the presence of a biomarker of interest by using electric field focusing to immobilize proteins followed by application of a highly sensitive electrochemical impedance spectroscopy platform.

Figure 8:
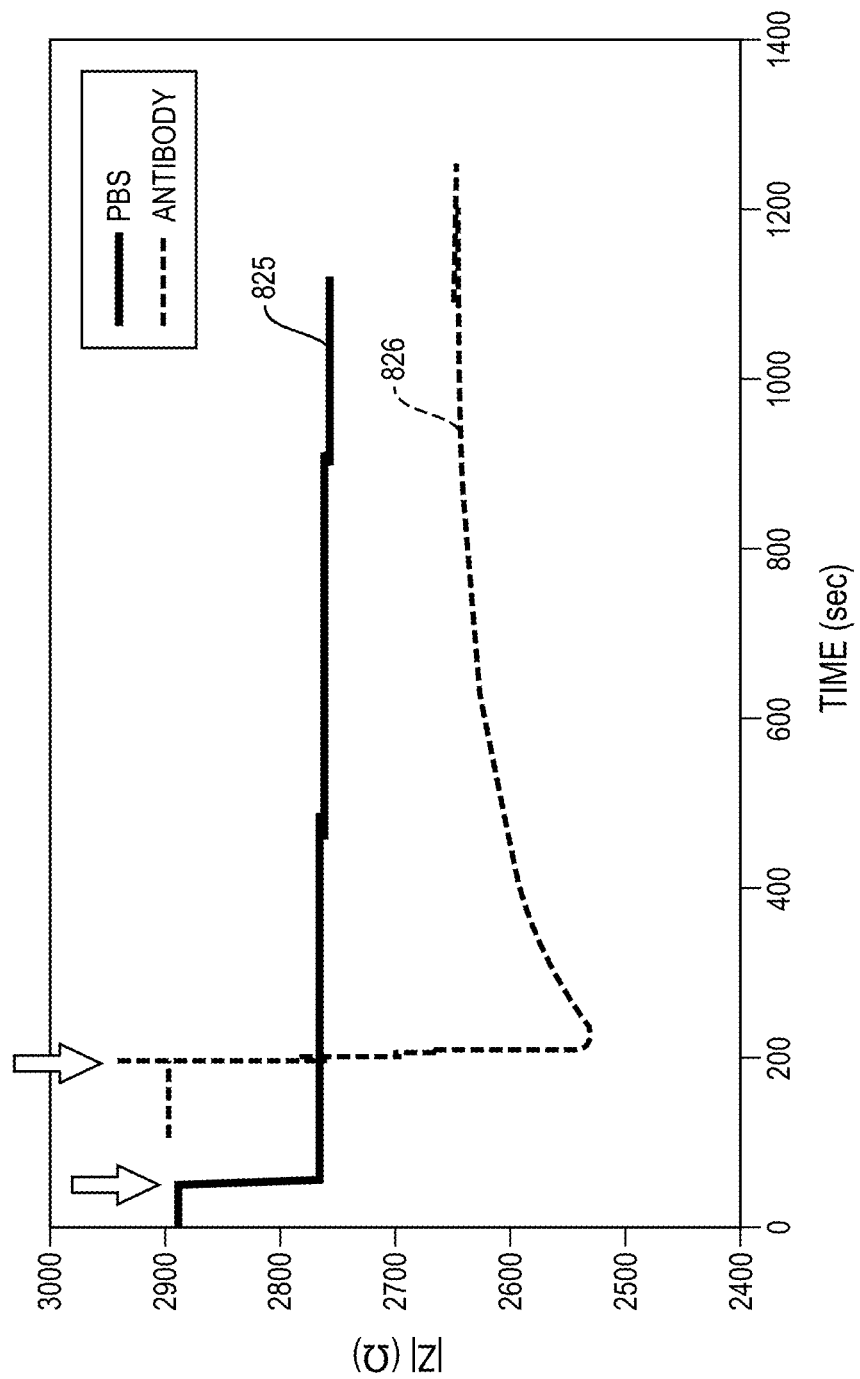
FIG. 8 is a plot illustrating various measurements using a nanowell array.

FIG. 8 is a plot 800 illustrating measurements for a buffer solution 825 and antibodies 826 using a nanowell array 715. Measurements were observed to be completed within 20-minutes following deposition of the sample.

In some embodiments, a system that can be utilized relatively easily by children may be operated by receiving a normally exhaled breath. In these embodiments, a nozzle may be configured to contract, and thus accelerate the exhaled air to a desired speed prior to encountering the impact plate. The purpose for this process is to change the flow characteristics of impaction to enhance particle capture. Efficiency of capturing aerosolized droplets may be measured for droplets of 0.5 to 100 microns in diameter, representing a typical range of droplets exhaled by individual human subjects (Lindsley et al. 2012)).

Embodiments seek to avoid the possibility of triggering a false positive due to the presence of antigens other than those for SARS-CoV-2 or H1N1. The methodology for performing this task includes the use of negative controls.

For SARS-CoV-2 detection, controls may be primarily the S-proteins associated with MERS-CoV and HCoV-HKU1. As MERS-CoV is closely related, but not as close as SARS-CoV-1, a true mark of success will be to distinguish between coronaviruses. For Influenza A or H1N1 detection, antigens for Influenza B may be used as a negative control to test the sensor's ability to distinguish flu viruses. Such spike antibodies and antigens for SARS-CoV-2 detection are currently commercially available. Results may be compared against a RT-PCR test.

Based on the estimated viral load from an individual with influenza, embodiments are sensitive enough to provide rapid, non-invasive testing of the type needed by children, without the possibility of infecting administering personnel. For example, a typical individual, with and after having influenza, emits approximately 105 droplets in a single cough, with sizes ranging from 0.3 mm-100 mm. In an experiment, the average of volume of particles per cough was around 30×10-12 L (Lindsley et al. 2012) and significantly larger, 125×10-9 L per cough based on Johnson et al. (2011). Although viral load in exhaled droplets is not known, it can be estimated based on the concentration of virus copies measured in patients (Wölfel et. al, 2020), ranging in number of RNA copies per milliliter from 103 to 108 for sputum samples, corresponding to a concentration ranging from 10-18 to 10-13 Molar. By decreasing the dimensions of each nanowell, sensitivity of the sensor may be increased to further improve the ability of embodiments to detect a virus within the above range. Finally, sensitivity of embodiments may be improved by lysing the captured virus, or by prompting a patient to direct multiple coughs into the breathalyzer system (e.g. mild throat-clearing coughs as used in Johnson et al. (2011)).

Embodiments may benefit from optimization of the nanowell sensors to detect the appropriate antigen-antibody pairs specific to SARS-CoV-2 virus, with a focus on sensitivity and selectivity. A target sensitivity may be that of the concentration of viral particles in sputum (103 to 108 RNA copies/mL) and specificity may be tested with negative controls, including antigens corresponding to MERS-CoV and HCoV-HKU1.

Previous work by Mahmoodi et al. (2020) demonstrated a sensitivity as low as 10 pg/mL when probing for TNF-α proteins. This task requires the determination of the limits of detection (LOD) for the sensor, when used to measure the presence of SARS-CoV-2 or Influenza A, H1N1. The basic output of the nanowell sensor is the impedance; conceptually, the impedance changes when the probe antibodies bound to the target antigens. Within a lab setting, these readings could be measured with a simple multimeter, but more controllably using LabVIEW VI's. Embodiments may thus be configured to quantify the changes in impedance associated with a positive measurement, separately from noise.

A readout of the sensor may be implemented upon a display for rapid interpretation of results. Embodiments may incorporate a simple digital display to provide a basic yes/no response to indicate whether or not a given virus is detected.

In-vitro testing of embodiments may be performed with simulated breath to determine new LOD. In this stage, the LOD of the sensor may be re-evaluated when installed in the collector. The LOD may be defined in incremental stages: (a) LOD of the sensor alone; (b) LOD of the sensor in a pulsatile, mechanical "breath;" (c) LOD of the sensor with additional contaminants in the pulsatile flow (e.g., increased moisture, solid particles). In evaluating the LOD in this way, one can determine not only the sensitivity of the completed system, but the sensitivity of the system under different operating conditions, each one approximating some aspect of human breath.

Some embodiments thus permit the incorporation of a time-varying flow. This can be accomplished in several ways. For example, a rotary valve can accomplish a time-varying inflow that will largely approximate a square wave. In contrast, a solenoid valve can be used to slowly open and close, which will more closely resemble the desired trend. Quantification of the inflow may be performed by monitoring output pressure and unsteady flow rate to arrive at conditions matching exhaled breath.

In some embodiments, a pressurized air line is connected to a pressure regulator that reduces the flow pressure to 1-psig, roughly the equivalent of a child's output breath. This reduced flow then passes into a mixing chamber, where aerosolized particles are introduced and distributed. Exiting the chamber, the flow enters the impactor, where particles are deposited onto the nanowell sensor. Within the nanowell sensor, an electric field immobilizes SARS-CoV-2 antibodies. As spike protein enters the sensor, they bound to the associated antibodies, increasing the impedance across the nanowell. The result is a voltage decrease, indicating that spike protein was successfully detected.

In some embodiments, a first stage of the viral breathalyzer is the capture mechanism, i.e., the portion of the device that efficiently captures the user's breath and deposits it onto the sensor. Embodiments may possess the ability to capture appropriately sized particles using physiologically characteristic pressures and flow rates. Embodiments can easily handle the relaxed breathing of even a child, are easy to use, and may not require an external power supply, making an implementation of such embodiments a self-contained diagnostic and its own lab.

FIGS. 9A-C are illustrations of an example nozzle component 927 of a capture device. In view 900a of FIG. 9A, an input 928 to the nozzle 927 is shown, into which a user will blow air and thus establish a flow direction 909. A region of accelerated airflow ("slow flow") 930 is established near an output 930 of the nozzle 927 due to an internal axial channel that narrows from the input 928 of the nozzle 927 to the output 930. A nanowell sensor may be mounted to sensor mount 931 to capture flowing particles. View 900b of FIG. 9B is a rotated view of the nozzle 927, wherein the nozzle 927 has been rotated 90 degrees about its axis. View 900c of FIG. 9C is a view of the nozzle 927 from directly overhead, denoting an area 932 in which a biosensor may be mounted.

Figure 10:
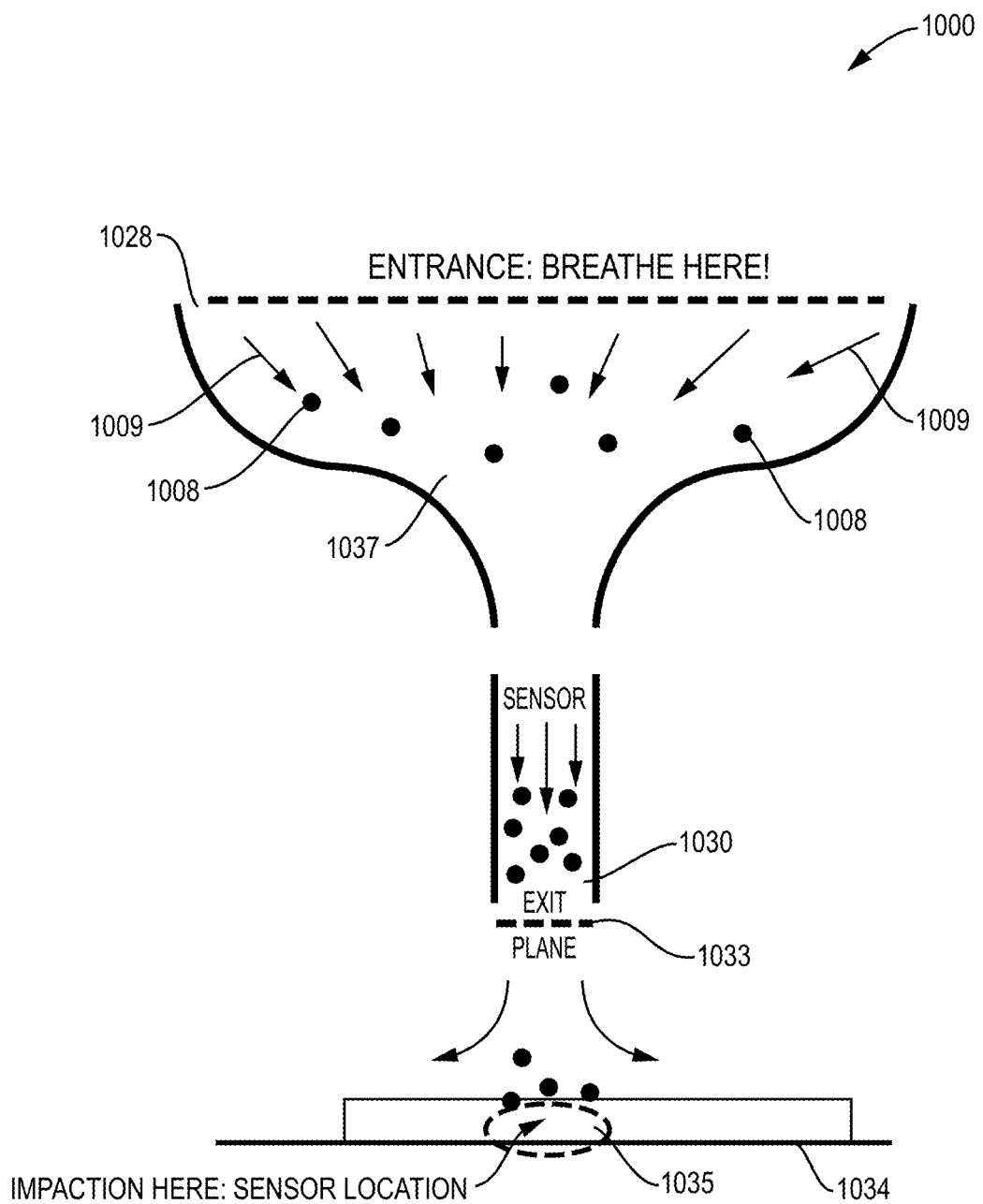
FIG. 10 is a schematic illustration of a capture device comprising an impactor, and a basic concept of operation thereof.

FIG. 10 is a schematic illustration of a capture device comprising an impactor 1000, and a basic concept of operation thereof. The illustrated impactor 1000 includes a nozzle such as nozzle 927 of FIGS. 9A-C. A user will breathe into a flared entrance 1028 under normal breathing conditions, propelling air and particles 1008 along a flow direction 1009. The nozzle of the impactor 1000 comprises an internal channel 1037 with a cross-sectional area that decreases along the axial direction of the impactor from the entrance 1028 to an exit 1030. Such decreasing cross-sectional area accelerates air flow. This accelerated flow crosses exit plane 1033 and thus exits the nozzle of the impactor 1000 as a jet, containing a mixture of breath and viral aerosol. An impaction plane 1034, containing the nanowell sensor at a location 1035, is located close to the exit plane of the nozzle. Because the flow cannot go through a solid wall as presented by the impaction plate 1034, it must turn; however, the particles 1008, having more inertia, are not able to change direction as rapidly as the flow, resulting in deposition on the nanowell sensor.

Figure 11:
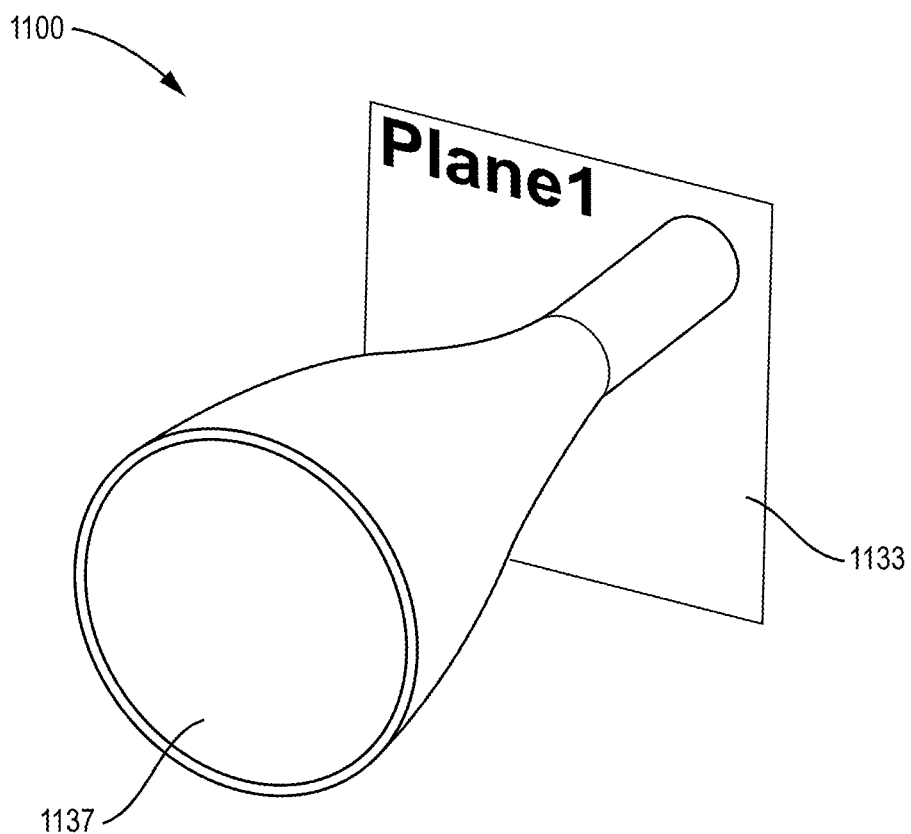
FIG. 11 is a CAD drawing of a nozzle of an impactor.

FIG. 11 is a CAD drawing 1100 of a nozzle of an impactor such as impactor 1000 of FIG. 10, showing the narrowing cross-sectional area of the internal channel 1137. Exit plane 1133 is depicted in FIG. 11 as "Plane1."

Figure 12:
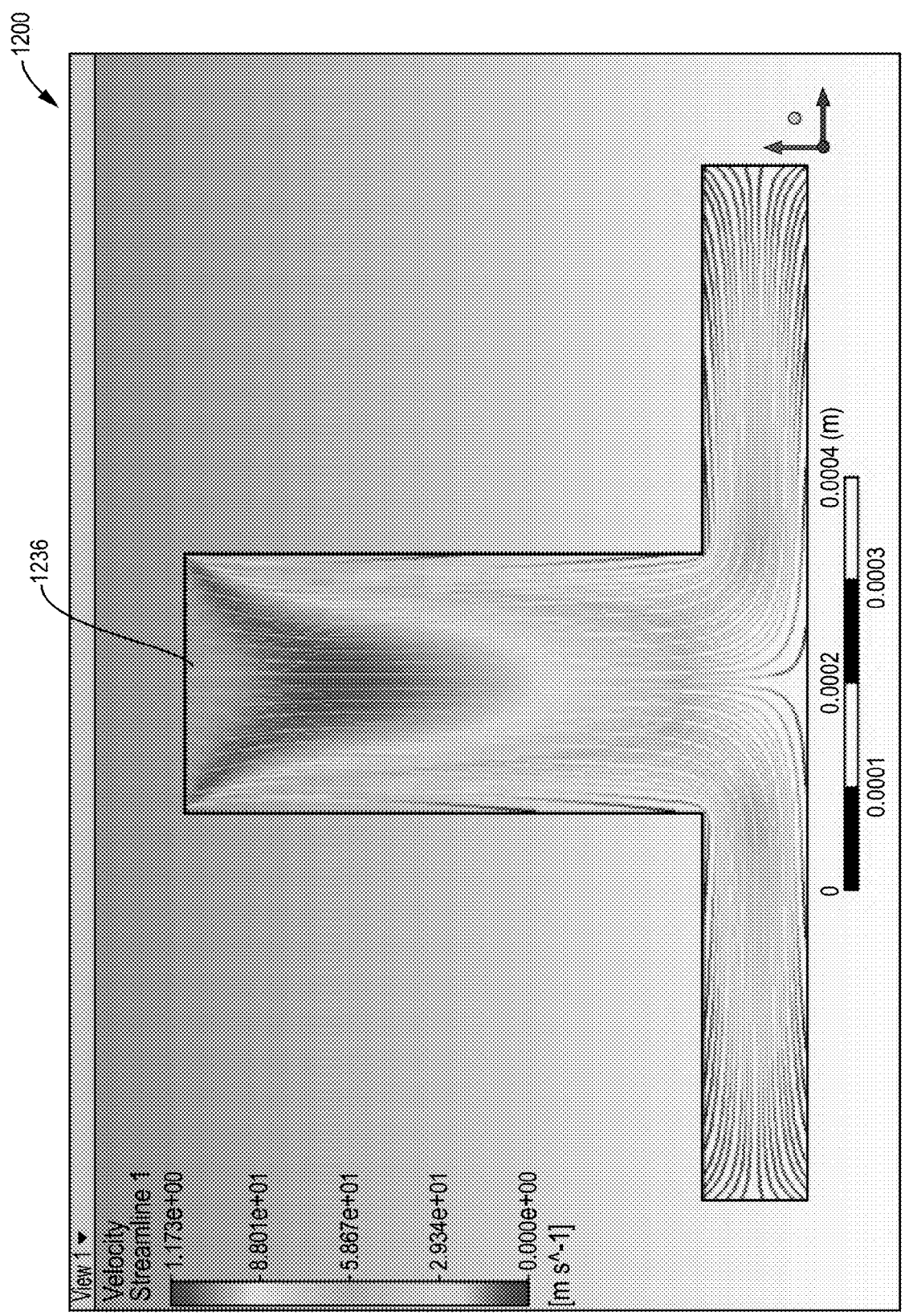
FIG. 12 is an output plot of a computer simulation of velocity of airflow within a nozzle embodiment.

FIG. 12 is an output plot 1200 of a computer simulation of velocity of airflow 1235 within a nozzle embodiment such as the nozzle of impactor 1000 of FIG. 10.

FIG. 13 is a schematic diagram of an example embodiment 1300 of a capture device comprising a nozzle component 1372 which includes an input mouthpiece 1373. Flow channel 1337 is depicted within the nozzle component. Screws 1338 mutually fasten complementary components of the nozzle component 1372. Impaction plate (i.e., impact plate) 1334 is attached to the end of the nozzle component 1372 opposite the input mouthpiece 1373. A nanowell sensor may be mounted to the impaction plate 1334 at sensor location 1335. Screws 1340 fasten the impaction plate 1334 to the nozzle component, while retaining gaps 1339 that allow a flow to escape the capture device, once particles from said flow are captured upon the nanowell sensor.

Tests have demonstrated that particle capture, under conditions associated with normal breathing, has been achievable with a system driven by 1-psig of pressure at an input and capable of passing 17 L/min of air, which is the correct order of magnitude for a person breathing out under normal conditions.

FIGS. 14A and 14B respectively show output images 1400a and 1400b of an example nanowell sensor array with individual nanowells 1416 depicted. FIG. 14C shows an associated topological representation of such nanowell sensors, in a plot 1400c of depth across a segment of a surface of such a nanowell sensor. Surface height 1441 and well depth 1442 are depicted on the plot 1400c.

As the ability to detect a virus is based on the selection of the immobilized antibody, the device is a VAT, while also allowing for easy reconfiguration for any type of respiratory virus. For this reason, embodiments provide a platform for respiratory virus testing beyond COVID-19. Tests for the sensitivity of the system have been performed using spike protein and phosphate-buffered saline (PBS) solution.

FIGS. 15A-D show results of such a sensitivity test. FIGS. 15A-B illustrate detection of a noticeable decrease in impedance following introduction of a spike protein within a 10-minute period. Specifically, FIG. 15A shows a 3% drop 1543a with a 1 µg/ml concentration of the spike protein, while FIG. 15B shows a 1.94% drop 1543b with a 0.2 µg/ml concentration of the spike protein. FIGS. 15C-D, on the other hand, show the response of the sensor against a control, which has the opposite effect, i.e., an increase in impedance, due to a lack of interaction with spike proteins. Specifically, FIG. 15C shows an increase 1543c in impedance for an il-6 negative control protein, while FIG. 15D shows an increase 1543d in impedance for a PBS solution.

Figure 16:
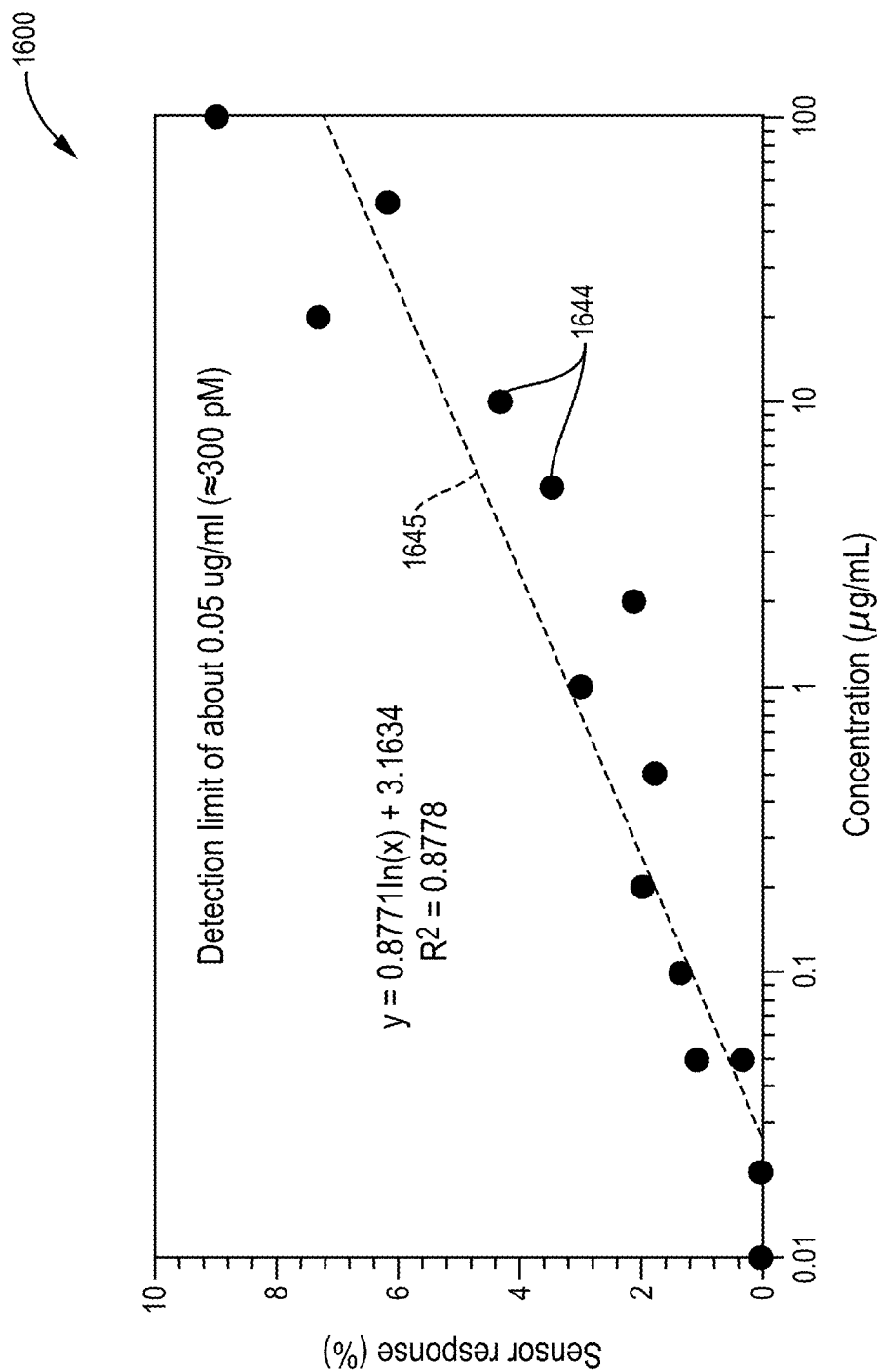
FIG. 16 is a plot showing example test data for a nanowell sensor demonstrating detection of SARS-CoV-2 spike proteins.

FIG. 16 is a plot 1600 showing example test data for a nanowell sensor demonstrating detection of SARS-CoV-2 spike proteins. The impedance sensor has been demonstrated to be capable of detecting down to 0.05 pg/mL (about 300 picoMolars), or lower. This capability is shown in the plot 1600 via data series 1644 and linear regression model 1645. Some embodiments may be capable of detecting at least down to 100 femtoMolars, within the detection limit of other commercially available, albeit invasive tests available on the market.

A series of intermediate tests have been performed in order to assess operation of the full system. First, a series of impactors were manufactured using 3D printing. A table-top experiment was then constructed to prove that the device could perform as predicted by simulations. A 1-psig stream of air was passed through the device with 4-micron particles of water injected into the air stream. An accumulation of large water droplets associated with water buildup was observed on the impactor plane, demonstrating that the system could concentrate aerosol from an air flow.

FIG. 17 is a block diagram illustrating an example 1700 of the experimental setup of the integrated system, where a nanowell sensor itself worked as the impaction plate attached to a liquid impactor 1748 for these tests. The upstream system, including inlet system 1746, is designed to decrease and condition the incoming air, while the aerosol generator 1747 introduces 4-micron particles into the air stream prior to its entering the impactor 1748, to simulate an individual human subject exhaling into the device.

Figure 18:
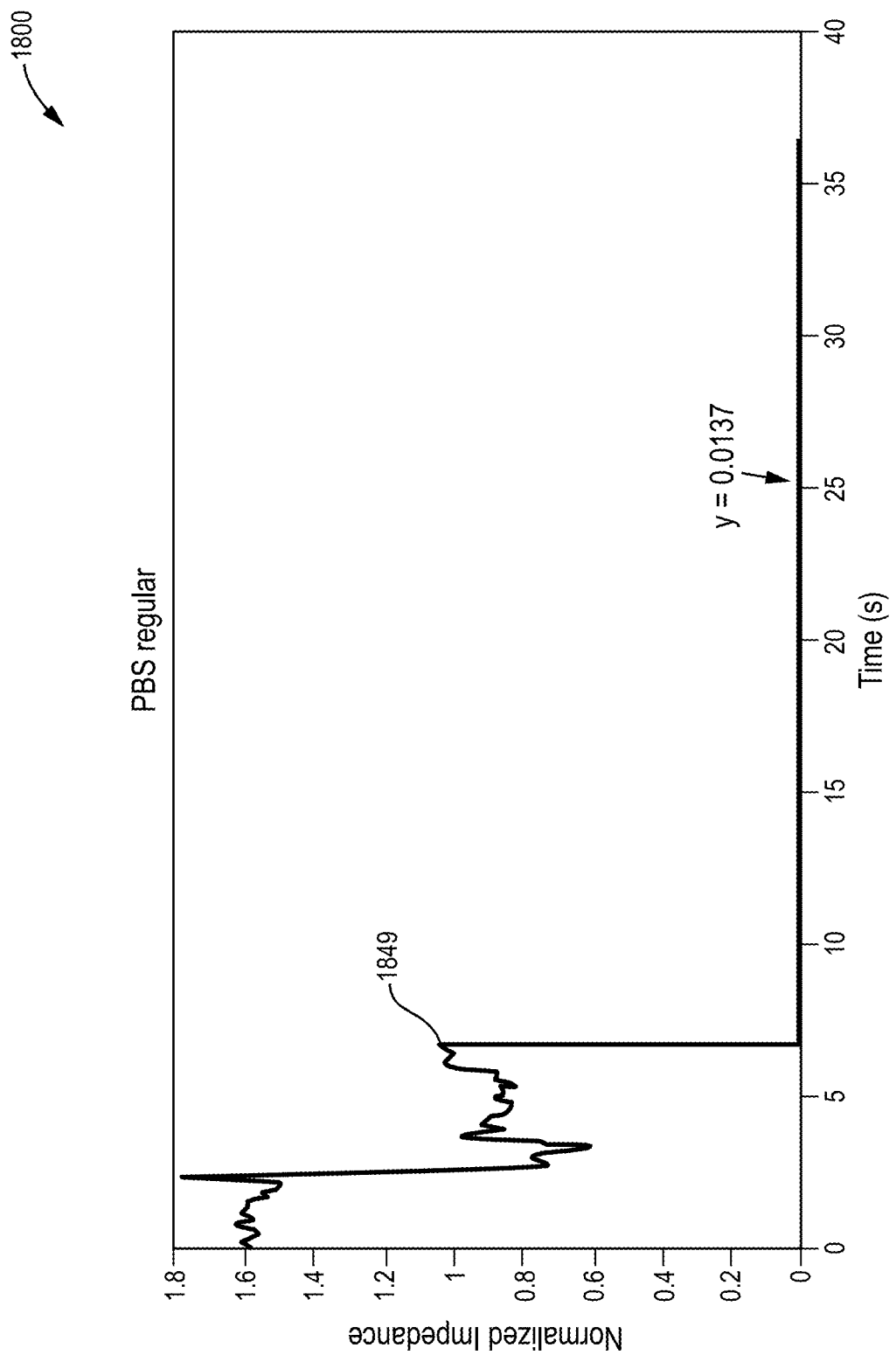
FIG. 18 is a plot showing normalized impedance versus time for an example nanowell impedance sensor.

FIG. 18 is a plot 1800 showing normalized impedance versus time for a nanowell impedance sensor. Following a successful visual detection of water on the impaction surface, a series of tests were performed on such a sensor to determine if the sensor could successfully detect atomized PBS particles introduced into the air stream. Particles of a 4-micron diameter were used for this set of experiments. The results of this test indicate a measurable change 1849 in system impedance due to accumulation of PBS on the sensor. Importantly, the system responded to the signal almost immediately.

All such aforementioned tests have been performed within bio-safety cabinets of a BSL-2 facility professionally assessed to provide a sufficient level of precaution.

Figure 19D:
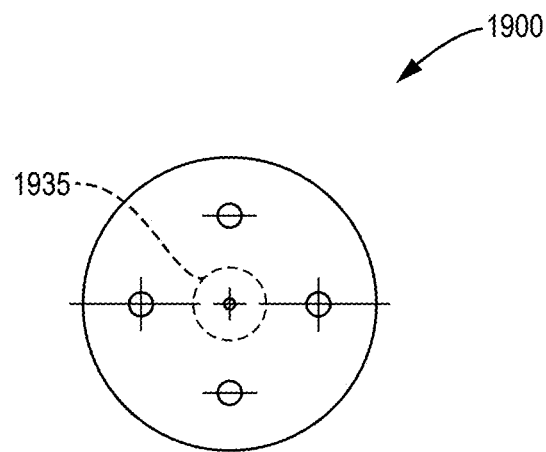
Figure 19E:
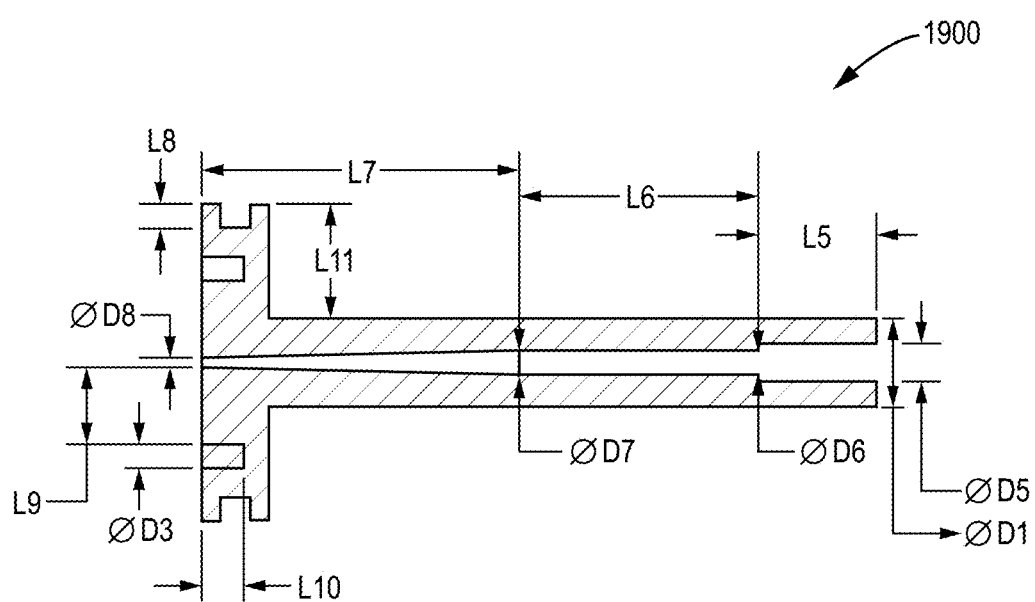

FIGS. 19A-E show various views of an example embodiment of a nozzle component 1900 of a capture device. FIG. 19A is a side view showing dimensions including lengths L1, L2A, L2B, and L3, and diameters D1 and D2. FIG. 19B is a view of an output end of the nozzle component 1900, showing dimensions including screw pitch L4, diameter D2, and screw hole diameter D3. FIG. 19C is a perspective view of the nozzle component 1900 showing diameter D4. FIG. 19D repeats the end view of FIG. 19B, but indicates a sensor location 1935, and introduces arrows to define the view of section E-E of FIG. 19E. FIG. 19E thus shows a sectional view with various dimensions noted, including lengths L5-L11, and diameters D1, D3, and D5-D8.

Figure 20A:
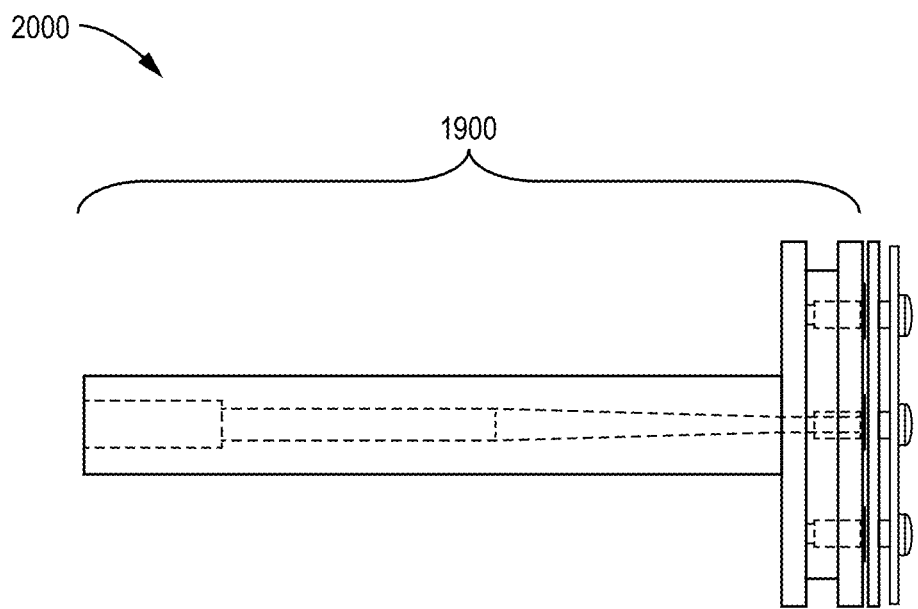
FIGS. 20A-E are CAD drawings showing various views of an example embodiment of a capture device.
Figure 20B:
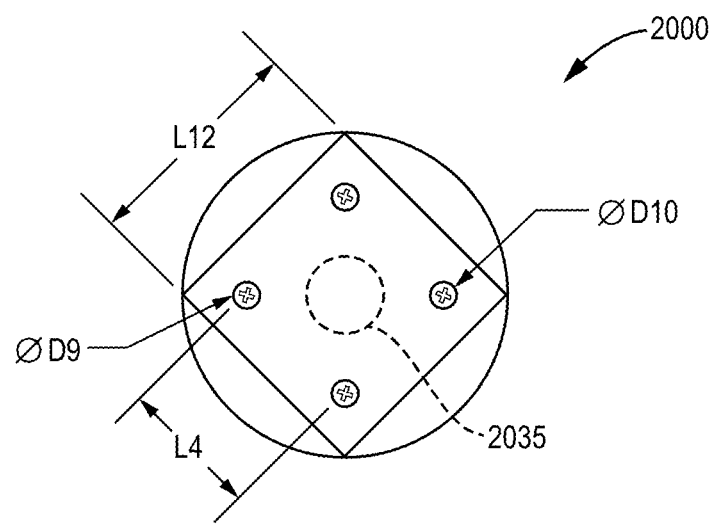
Figure 20C:
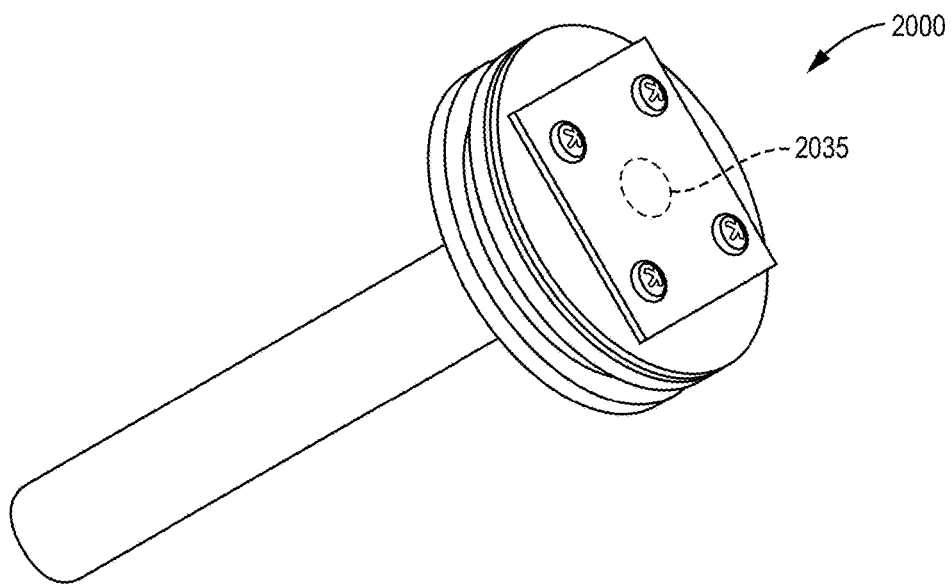
Figure 20D:
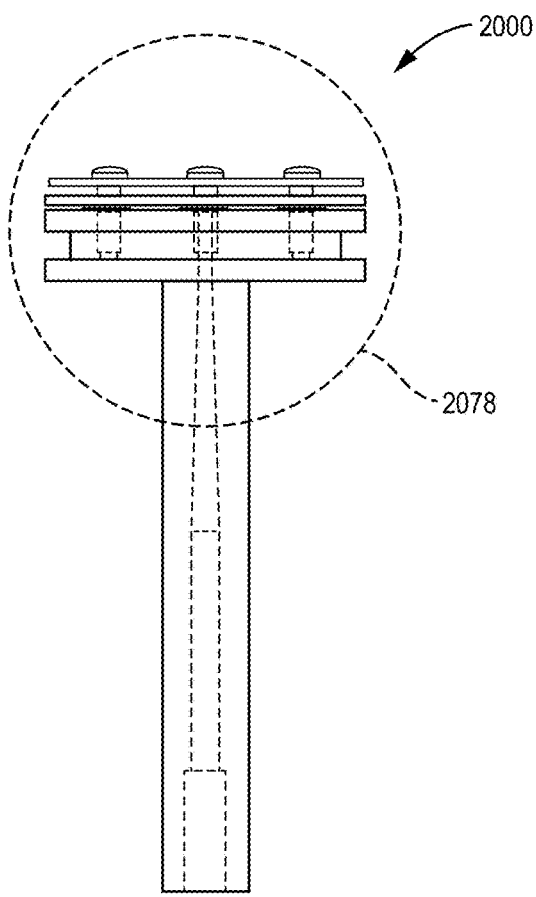
Figure 20E:
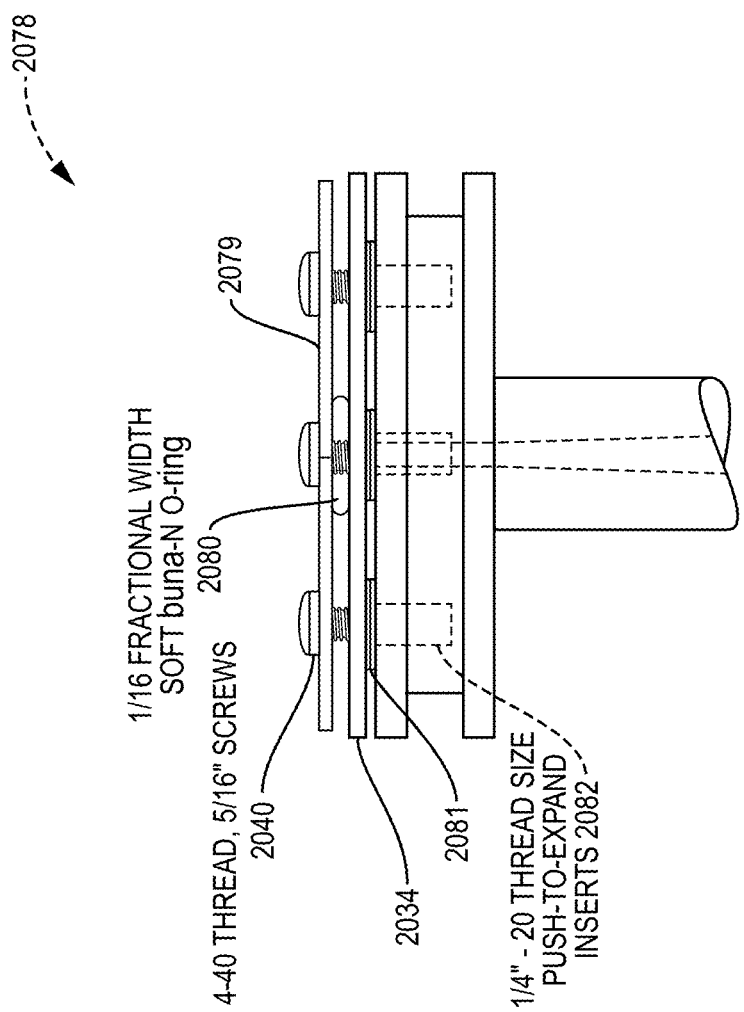

FIGS. 20A-E show various views of an example embodiment of a capture device 2000, i.e., impactor. FIG. 20A is a side view of the capture device 2000 including nozzle component 1900. FIG. 20B is an end view of the capture device 2000 with sensor location 2035 visible, and various dimensions depicted. Such dimensions include screw pitch L4, length L12, screw head diameter D9, and screw shaft diameter D10. FIG. 20C shows a tilted view of capture device 2000 with sensor location 2035 depicted. FIG. 20E illustrates a detail view 2078 of the capture device 2000 of FIG. 20D. FIG. 20E depicts various components of the capture device 2000, including acrylic slide 2079, screws 2040 with example dimensions shown, an example O-ring 2080, back plate 2034, shims 2081 included to establish a gap through which a flow may exit the capture device 2000, and expanding inserts 2082, to hold screws 2040, with example dimensions shown for inserts 2082.

Figure 21A:
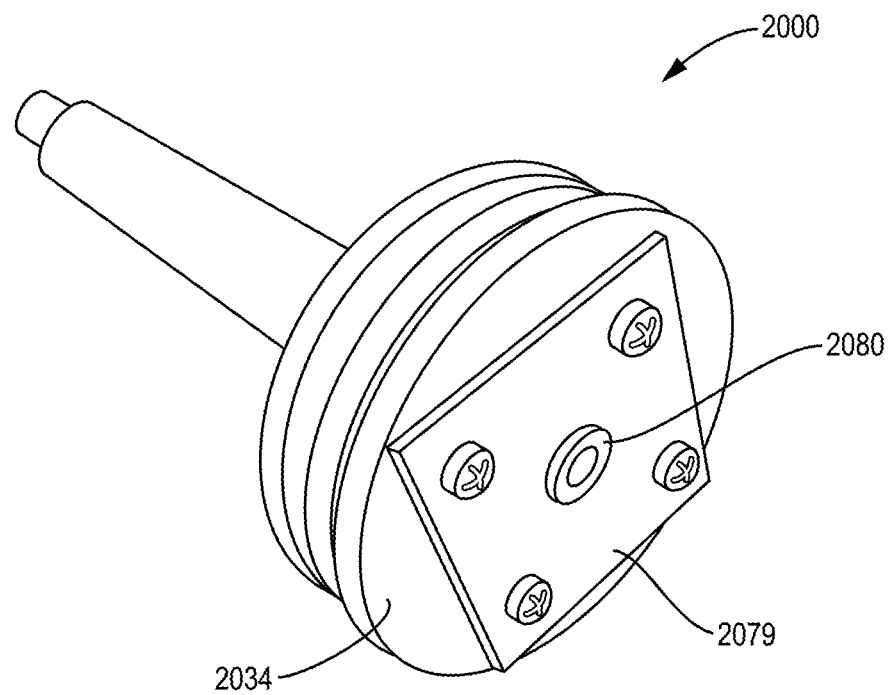
FIG. 21A shows a perspective view of an example embodiment of a capture device.

FIG. 21A shows a perspective views of an example embodiment of a capture device 2000 illustrating O-ring 2080 between back plate 2034 and acrylic slide 2079.

Figure 21B:
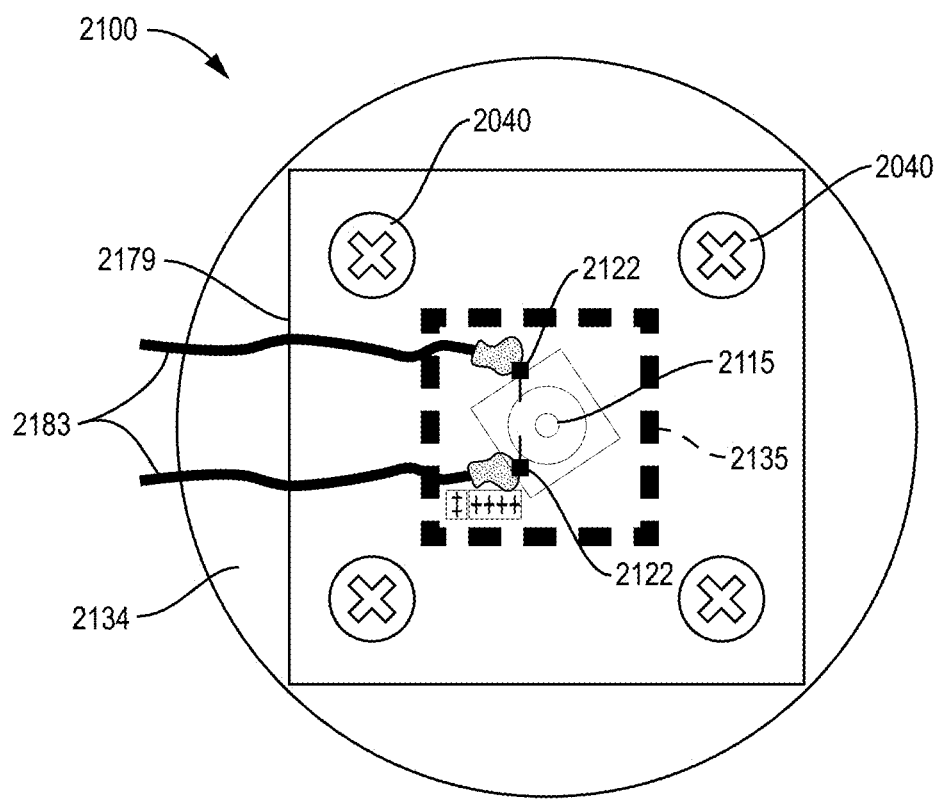
FIG. 21B shows an end view 2100 of capture device 2000, wherein various features are depicted.

FIG. 21B shows an end view of a capture device 2100, which is similar to capture device 2000, wherein a PDMS well of nanowell sensor 2115, electrodes 2122 with attached leads 2183, screws 2040, acrylic slide 2179, and back plate 2134 are shown.

Figure 22:
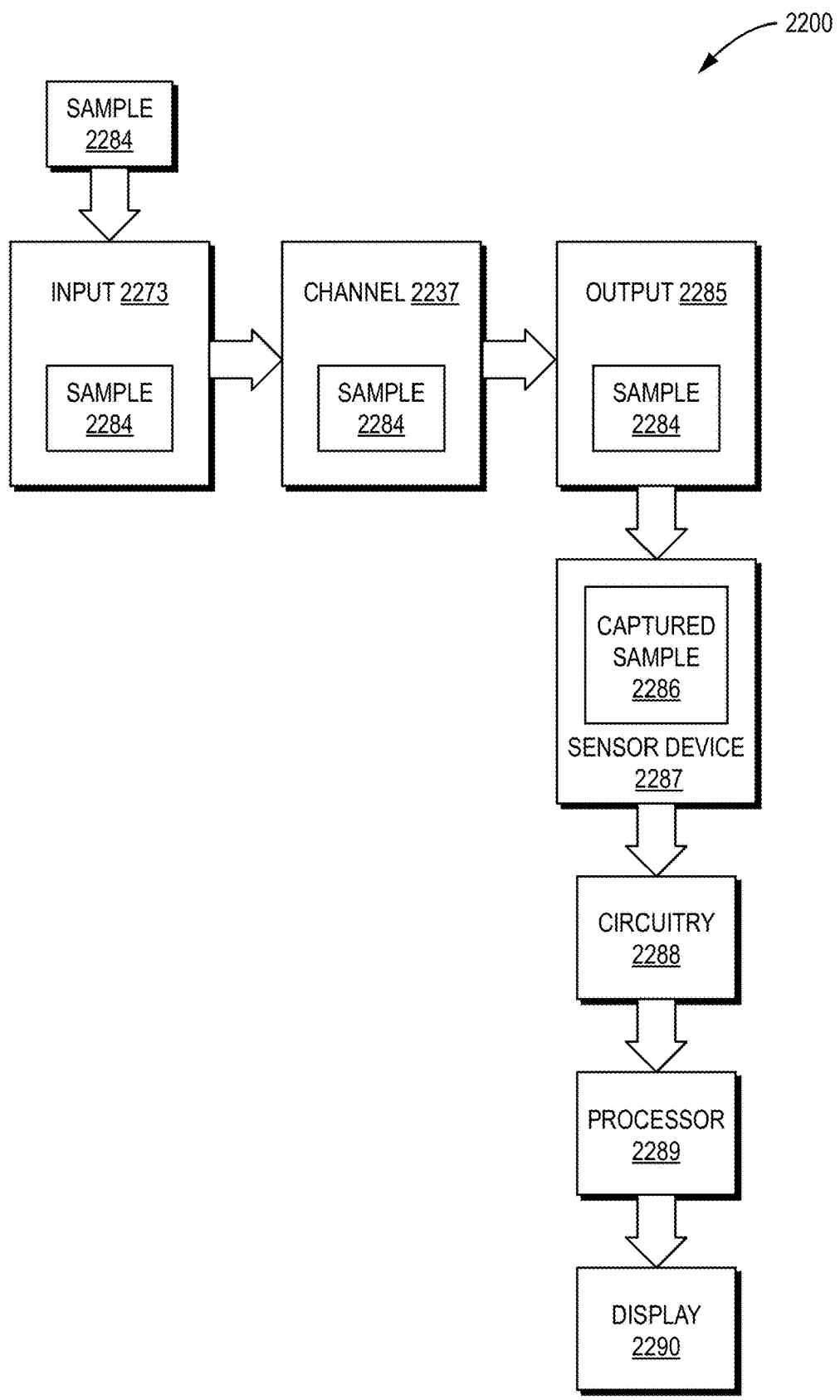
FIG. 22 is a block diagram illustrating an example embodiment of a system for capturing and detecting a target analyte in a sample.

FIG. 22 is a block diagram illustrating an example embodiment of a system 2200 for capturing and detecting a target analyte in a sample 2284, e.g., a sample comprising an aerosol. The system 2200 includes a capture device, to capture a sample 2284 comprising an aerosol including a target analyte, the capture device including an input 2273 to receive the sample 2284, an output 2285 to release a sample 2284 for capturing, and a channel 2237 to flow the sample 2284 from the input 2273 toward the output 2285. The channel 2237 is configured to accelerate the flowing sample 2284 to allow capturing of particles from the flowing sample 2284, to thereby generate a captured sample 2286 including the target analyte. The system further includes a sensor device 2287 coupled to the capture device to receive at least a portion of the captured sample 2286 including the target analyte. The sensor device 2287 is configured to detect the target analyte in the captured sample based on an impedance measurement. Circuitry 2288 may perform the impedance measurement. Data pertaining to the impedance measurement is transferred to a processor 2289, which determines therefrom whether or not a given virus is present in the sample 2284. A display 2290 may then be configured to communicate the determination of the processor 2289 to a user. An example of how the determination can be communicated to the user is illustrated in FIG. 2.

The capture device can include a nozzle, wherein (i) a proximal end of the nozzle includes the input 2273 of the capture device, (ii) a distal end of the nozzle includes the output 2285 of the capture device, and (iii) the distal end of the nozzle further includes a flange configured to facilitate coupling of the sensor device 2287 to the capture device.

The capture device can further include an impact plate mechanically coupled with (i) the flange of the distal end of the nozzle and (ii) the sensor device 2287, the impact plate configured to capture the particles in the flowing sample, the impact plate thus forming, with the nozzle, a liquid impactor as the capture device.

The impact plate can be configured to receive the particles in the flowing sample 2284 at an angle within 5 percent of 90 degrees with respect to a parallel plane of the impact plate.

The nozzle can provide for an internal travel distance between the input 2273 and output 2285 of the capture device within 5 percent of 108 mm. Other nominal values for internal travel distance may alternatively be used, including, but not limited to 83 mm, 88 mm, 93 mm, 98 mm, 103 mm, 113 mm, 118 mm, 123 mm, 128 mm, and 133 mm.

The impact plate can be mounted a distance apart from the output 2285 of the capture device, the distance being sufficient to allow flow to escape from the output 2285.

The channel can be configured to accelerate the flowing sample 2284 to a velocity within 10 percent of one hundred meters per second.

The system 2200 can include circuitry 2288 operatively coupled with the sensor device 2287 and configured to (i) apply an electrical voltage to the captured sample 2286 and (ii) perform the impedance measurement to detect the target analyte in the captured sample 2286.

The sensor device 2287 can include a sensor array including a pair of conducting electrodes, the electrodes separated by a gap, an insulator disposed in the gap between the electrodes, and plural wells defined by one of the electrodes and the insulator, to expose the other of the electrodes. The wells can be configured to receive a captured sample 2286 including the target analyte, the target analyte, when present in the captured sample 2286 received in the wells, modulating an impedance between the electrodes, the impedance measurement performed to quantify the modulated impedance, the modulated impedance being indicative of the concentration of the target analyte in the captured sample 2286.

The system can include a processor 2289 operatively coupled with the sensor device 2287, the processor 2289 configured to calculate a concentration of the target analyte in the captured sample 2286 as a function of the modulated impedance.

The system can include an output display unit 2290 responsive to the detected target analyte and configured to generate an indication that a subject is testing positive or negative for the target analyte based on the concentration of the target analyte detected in the captured sample 2286.

FIG. 23 illustrates an example embodiment of a method 2300 of capturing and detecting a target analyte in a sample comprising an aerosol. The method 2300 includes capturing 2391 a sample comprising an aerosol including a target analyte at a capture device. The sample is captured by (i) receiving 2391a the sample at an input of the capture device, (ii) flowing 2391b the sample through a channel from the input toward an output of the capture device, the channel configured to accelerate the flowing sample to allow capturing of particles from the flowing sample, and (iii) releasing 2391c the sample for capturing from the output of the capture device, to thereby generate a captured sample including the target analyte. The method further includes receiving 2392 at least a portion of the captured sample at a sensor device coupled to the capture device; and detecting 2393, based on an impedance measurement, the target analyte in the captured sample.

The method 2300 can include accelerating the sample flowing in the channel to a velocity within 10 percent of one hundred meters per second.

In the method 2300, the sensor device can include a sensor array including a pair of conducting electrodes, the electrodes separated by a gap, an insulator disposed in the gap between the electrodes, and plural wells defined by one of the electrodes and the insulator, to expose the other of the electrodes. The method 2300 can further include receiving a captured sample including the target analyte at a given well of the plural wells, the target analyte, when present in the captured sample received in the wells, modulating an impedance between the electrodes, applying an electrical voltage to the impedance between the electrodes; performing the impedance measurement with the applied electrical voltage to quantify the modulated impedance, and calculating the concentration of the target analyte in the captured sample as a function of the modulated impedance.

The aerosol sample can be an exhaled breath sample. The capture device and the sensor device can be integrated into a handheld breathalyzer, to capture and detect a target analyte in the exhaled breath sample.

The target analyte can be a virus, such as SARS-CoV-2 or other respiratory viruses. The sensor device can use antibodies or aptamers to bind the virus.

Several advantages of the systems and methods of the present disclosure are as follows. Firstly, unlike known breathalyzers that analyze one or more gases in an exhaled breath sample to detect a disease or an infection, the present approach can directly detect the presence (e.g. concentration) of virus particles in a sample.

To continue, as society transitions from full quarantine towards a state of partial re-opening and slowly into a new concept of normalcy, the need for increased, widespread, and rapid testing is crucial for contact-tracing and containing new outbreaks. Two major obstacles prevent the realization of this goal: the invasiveness and complexity of current tests, requiring their administration/supervision by qualified individuals; and bottlenecks and time delays associated with lab processing by experienced technicians. There is also a third aspect that could play a role in some cases: invasive tests can be intimidating to a young child, disabled adults, and other vulnerable populations. This becomes increasingly challenging the more frequently testing needs to be performed. This is further echoed by the NIH, who recognizes that many factors may affect testing rates, including ethical, historical, healthcare, social, economic, contextual, cultural, and preferential factors.

Considering currently available testing products, major constraints are: (a) ease of use; (b) lead time; (c) the need for supervision by a healthcare professional. Current PCR tests cannot meet all three constraints. In contrast, systems and methods of the present disclosure do not require direct intervention by a healthcare professional, being simple enough to be used by directly by the patient. Even more attractive is the quick-turnaround time provided by the systems and methods of the present disclosure, which may furnish results within 10 minutes, or 20 minutes of taking the test, depending upon embodiments. PCR tests cannot operate on such swift timetables, as samples have to be transported to labs and processed to create DNA samples from the RNA collection. During this process, RNA can degrade, which can further impact effectiveness.

Systems disclosed herein include self-contained, disposable breathalyzer units to facilitate widespread public usage in homes, schools, hospitals, or other public facilities (e.g. mass transit or sporting events).

Imagine if viral testing were as simple as taking a temperature using an infrared thermometer. A testing platform that provides non-invasive and rapid results, requires little or no guidance and supervision, and can easily adapt to changes/mutations or new viral threats, could be used in numerous different settings. This would be a technology immediately embraced by the population. In a target demographic of children returning to school, the technology of the present disclosure would be used to routinely test students in the classroom. Schools would also adopt the technology more broadly to test teachers, administrators, and other members of the community that come in regular contact with the children. The previously unmet need is to create a simple diagnostic without the invasiveness of a nasal swab, the time lag of a PCR test, or the need for trained health professionals to risk exposure through administration. These elements are obstacles to widespread testing within schools, where young children may be intimidated by the application of a nasal swab.

Existing tests require device-readers that need to be handled by personnel and have costs associated with them that range around $500 or more without discounting. Device readers that are handled by multiple staff will be subject to precautions wherein staff members may be expected to clean devices between uses. All heretofore approved tests require swabbing, which is more invasive than the systems and methods for testing as disclosed herein. A breathalyzer product created according to the present disclosure may be disposable, thus minimizing handling precautions required (except for disposal).

REFERENCES

Coronavirus Testing Basics, 2020, accessed October 2020 (https://www.fda.gov/consumers/consumer-updates/coronavirus-testing-basics)

Overview of Testing for SARS-CoV-2 (COVID-19), 2020, accessed October 2020 (https://www.cdc.gov/coronavirus/2019-ncov/hcp/testing-overview.html)

Hilpert, M., Ilievskia, V., Shao-Yiu, H., Rule, A. M., Olmedo, P., Drazer, G., "E-cigarette Aerosol Collection Using Converging and Straight Tubing Sections: Physical Mechanisms", J. Colloid Interface Sci., 2020, in press.

Johnson, G. R., Morawska, L., Ristovski, Z. D., Hargreaves, M., Mengersen, K., Chao, C. Y. H., Wan, M. P., Li, Y., Katoshevski, D., and Corbett, S., "Modality of human expired aerosol size distributions," J. Aerosol Sci., 2011, Vol. 42, No. 12, pp. 839-851.

Lindsley, W. G., Pearce, T. A., Hudnall, J. B., Davis, K. A., Davis, S. M., Fisher, M. A., Khakoo, R., Palmer, J. E., Clark, K. E., Celik, I., Coffey, C. C., Blachere, F. M., and Beezhold, D. H., "Quantity and size distribution of cough-generated aerosol particles produced by influenza patients during and after illness," J. Occup. Environ. Hyg., 2012, Vol. 9, No. 7, pp. 443-449.

Lu, R., Zhao, X., Li, J., Niu, P., Yang, B., Wu, H., Wang, W., Song, H., Huang, B., Zhu, N., Bi, Y., Ma, X., Zhan, F., Wang, L., Hu, T., Zhou, H., Hu, Z., Zhou, W., Zhao, L., Chen, J., et al., "Genomic characterization and epidemiology of 2019 novel coronavirus: implications for virus origins and receptor binding," Lancet, 2020, Vol. 395, pp. 565-574.

Mahmoodi, S. R., Xie, P., Allen, M., and Javanmard, M., "Multiwell plate impedance analysis of a nanowell array sensor for label-free detection of cytokines in mouse serum," Chemical and Biological Sensors, 2020, Vol. 4, No. 2, 4500104.

Seo, G., Lee, G., Kim, M. J., Baek, S. H., Choi, M., Ku, K. B., Lee, C. S., Jun, S., Park, D., Kim, H. G., Kim, S. J., Lee, J. O., Kim, B. T., Park, E. C., and Kim, S. I., "Rapid detection of COVID-19 causative virus (SARS-CoV-2) in human nasopharyngeal swab specimens using field-effect transistor-based biosensor," ACS Nano, 2020, Vol. 14, No. 4, pp. 5135-5142.

Verreault, D., Moineau, S., and Duchaine, C., "Methods for sampling of airborne viruses," Microbiol. Mol. Biol. R., 2008, Vol. 72, No. 3, pp. 413-444.

Wölfel, Roman, Victor M. Corman, Wolfgang Guggemos, Michael Seilmaier, Sabine Zange, Marcel A. Müller, Daniela Niemeyer, et al. "Virological Assessment of Hospitalized Patients with COVID-2019." Nature 581, no. 7809 (May 2020): 465-69. https://doi.org/10.1038/s41586-020-2196-x.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for capturing and detecting a target analyte in a sample comprising an aerosol, the system comprising:
   a capture device to capture a sample comprising an aerosol including a target analyte, the capture device including (i) an input to receive the sample, (ii) an output to release the sample for capturing, and (iii) a channel to flow the sample from the input toward the output, the channel configured to accelerate the flowing sample to allow capturing of particles from the flowing sample, to thereby generate, at the output, the captured sample including the target analyte; and a sensor device coupled to the capture device to receive, from the output of the capture device, at least a portion of the captured sample including the target analyte, the sensor device configured to detect the target analyte in the captured sample based on an impedance measurement.

2. The system of claim 1, wherein the capture device includes a nozzle, wherein (i) a proximal end of the nozzle includes the input of the capture device, (ii) a distal end of the nozzle includes the output of the capture device, and (iii) the distal end of the nozzle further includes a flange configured to facilitate coupling of the sensor device to the capture device.

3. The system of claim 2, wherein the capture device includes an impact plate mechanically coupled with (i) the flange of the distal end of the nozzle and (ii) the sensor device, the impact plate configured to capture the particles in the flowing sample, the impact plate thus forming, with the nozzle, a liquid impactor as the capture device.

4. The system of claim 3, wherein the impact plate is configured to receive the particles in the flowing sample at an angle within 5 percent of 90 degrees with respect to a parallel plane of the impact plate.

5. The system of claim 3, wherein the nozzle provides for an internal travel distance between the input and output of the capture device within 5 percent of 108 mm.

6. The system of claim 3, wherein the impact plate is mounted apart from the output of the capture device, at a distance less than or equal to 2 mm from the output of the capture device.

7. The system of claim 1, wherein the channel is configured to accelerate the flowing sample to a velocity within 10 percent of one hundred meters per second.

8. The system of claim 1, further comprising circuitry operatively coupled with the sensor device and configured to (i) apply an electrical voltage to the captured sample and (ii) perform the impedance measurement to detect the target analyte in the captured sample.

9. The system of claim 1, wherein the sensor device includes a sensor array comprising:
a pair of conducting electrodes, the electrodes separated by a gap;

an insulator disposed in the gap between the electrodes; and plural wells defined by one of the electrodes and the insulator, to expose the other of the electrodes, the wells configured to receive a captured sample including the target analyte, the target analyte, when present in the captured sample received in the wells, modulating an impedance between the electrodes, the impedance measurement performed to quantify the modulated impedance, the modulated impedance being indicative of the concentration of the target analyte in the captured sample.

10. The system of claim 1, further comprising a processor operatively coupled with the sensor device, the processor configured to calculate a concentration of the target analyte in the captured sample as a function of the modulated impedance.

11. The system of claim 1, wherein the aerosol sample is an exhaled breath sample and the capture device and the sensor device are integrated into a handheld breathalyzer.

12. The system of claim 1, wherein the target analyte is a virus and the sensor device uses antibodies or aptamers to bind the virus.

13. The system of claim 1, further comprising an output display unit responsive to the detected target analyte and configured to generate an indication that a subject is testing positive or negative for the target analyte based on the concentration of the target analyte detected in the captured sample.

14. A method of capturing and detecting a target analyte in a sample comprising an aerosol, the method comprising:
capturing a sample comprising an aerosol including a target analyte at a capture device by (i) receiving the sample at an input of the capture device, (ii) flowing the sample through a channel from the input toward an output of the capture device, the channel configured to accelerate the flowing sample to allow capturing of particles from the flowing sample, and (iii) releasing the sample for capturing from the output of the capture device, to thereby generate a captured sample including the target analyte;

receiving, from the output of the capture device, at least a portion of the captured sample at a sensor device coupled to the capture device; and detecting, based on an impedance measurement, the target analyte in the captured sample.

15. The method of claim 14, wherein the capture device includes a nozzle, wherein (i) a proximal end of the nozzle includes the input of the capture device, (ii) a distal end of the nozzle includes the output of the capture device, and (iii) the distal end of the nozzle further includes a flange configured to facilitate coupling of the sensor device to the capture device.

16. The method of claim 15, wherein the capture device includes an impact plate mechanically coupled with (i) the flange of the distal end of the nozzle and (ii) the sensor device, the impact plate configured to capture the particles in the flowing sample, the impact plate thus forming, with the nozzle, a liquid impactor as the capture device.

17. The method of claim 14, further comprising accelerating the sample flowing in the channel to a velocity within 10 percent of one hundred meters per second.

18. The method of claim 14, wherein the sensor device includes a sensor array comprising:

a pair of conducting electrodes, the electrodes separated by a gap;

an insulator disposed in the gap between the electrodes; and plural wells defined by one of the electrodes and the insulator, to expose the other of the electrodes;

the method further including:

receiving a captured sample including the target analyte at a given well of the plural wells, the target analyte, when present in the captured sample received in the wells, modulating an impedance between the electrodes;

applying an electrical voltage to the impedance between the electrodes;

performing the impedance measurement with the applied electrical voltage to quantify the modulated impedance; and calculating the concentration of the target analyte in the captured sample as a function of the modulated impedance.

19. The method of claim 14, wherein the aerosol sample is an exhaled breath sample and the capture device and the sensor device are integrated into a handheld breathalyzer.

20. The method of claim 14, wherein the target analyte is a virus and the sensor device uses antibodies or aptamers to bind the virus.

* * * * *